United States Patent [19]
Gosselink et al.

[11] Patent Number: 5,415,807
[45] Date of Patent: May 16, 1995

[54] SULFONATED POLY-ETHOXY/PROPOXY END-CAPPED ESTER OLIGOMERS SUITABLE AS SOIL RELEASE AGENTS IN DETERGENT COMPOSITIONS

[75] Inventors: Eugene P. Gosselink; Robert Y. Pan; Patti J. Kellett, all of Cincinnati, Ohio; Robin G. Hall, Heaton, United Kingdom

[73] Assignee: The Procter & Gamble Company, Cincinnati, Ohio

[21] Appl. No.: 123,303

[22] Filed: Sep. 17, 1993

Related U.S. Application Data

[63] Continuation-in-part of Ser. No. 88,707, Jul. 8, 1993, abandoned.

[51] Int. Cl.$^6$ .............................................. C11D 3/37
[52] U.S. Cl. .............................. 252/174.21; 252/8.7; 252/8.9
[58] Field of Search ................ 252/8.7, 8.9, 174.21

[56] References Cited

U.S. PATENT DOCUMENTS

| | | | |
|---|---|---|---|
| 3,712,873 | 1/1973 | Zenk | 260/29.2 |
| 4,238,531 | 12/1980 | Rudy et al. | 427/242 |
| 4,618,457 | 10/1986 | Esselborn et al. | 252/8.9 U X |
| 4,702,857 | 10/1987 | Gosselink | 252/174.21 |
| 4,711,730 | 12/1987 | Gosselink et al. | 252/8.75 |
| 4,713,194 | 12/1987 | Gosselink | 252/174.23 |
| 4,721,580 | 1/1988 | Gosselink | 252/90 |
| 4,764,289 | 8/1988 | Trinh | 252/8.6 |
| 4,818,569 | 4/1989 | Trinh et al. | 427/242 |
| 4,861,512 | 8/1989 | Gosselink | 252/174.23 |
| 4,877,896 | 10/1989 | Maldonado et al. | 560/14 |
| 4,956,447 | 9/1990 | Gosselink et al. | 528/272 |
| 4,968,451 | 11/1990 | Scheibel et al. | 252/549 |
| 4,976,879 | 12/1990 | Maldonado et al. | 252/8.7 |
| 5,039,782 | 8/1991 | Langer et al. | 528/272 |
| 5,041,230 | 8/1991 | Borcher, Sr. et al. | 252/8.9 |
| 5,082,578 | 1/1992 | Langer et al. | 252/8.7 |
| 5,182,043 | 1/1993 | Morrall et al. | 252/8.7 X |
| 5,256,168 | 10/1993 | Morrall et al. | 252/8.7 U X |

FOREIGN PATENT DOCUMENTS

| | | | |
|---|---|---|---|
| 1100262 | 5/1981 | Canada | D06M 13/34 |
| 0185427A2 | 6/1986 | European Pat. Off. | C08G 63/66 |
| 0272033A2 | 6/1988 | European Pat. Off. | C08G 63/66 |
| 2172608A | 9/1986 | United Kingdom | C11D 3/60 |
| WO92/04433 | 3/1992 | WIPO | C11D 3/00 |

OTHER PUBLICATIONS

Odian, G., "Principles of Polymerization, 2nd Ed.", 1981, pp. 18–20.
Odian, G., "Principles of Polymerization, 2nd Ed.", 1981, pp. 102–105.

*Primary Examiner*—Paul F. Shaver
*Attorney, Agent, or Firm*—M. D. Jones; K. W. Zerby; J. J. Yetter

[57] ABSTRACT

Anionic sulfonated poly-ethoxy/propoxy, especially modified isethionate, end-capped esters useful as soil release agents in detergent compositions are presented. The terephthalate esters are homogeneously integrated with one or more crystallization-reducing stabilizers.

28 Claims, No Drawings

SULFONATED POLY-ETHOXY/PROPOXY END-CAPPED ESTER OLIGOMERS SUITABLE AS SOIL RELEASE AGENTS IN DETERGENT COMPOSITIONS

CROSS REFERENCE TO RELATED APPLICATIONS

This application is a continuation-in-part of application Ser. No. 08/088,707, filed Jul. 8, 1993, now abandoned.

TECHNICAL FIELD

The present invention relates to anionic ester compositions useful as soil-releasing ingredients in fabric care compositions and processes, especially laundry detergents.

BACKGROUND OF THE INVENTION

A wide variety of soil release agents (s.r.a.'s) for use in in-home fabric treatment processes such as laundering, fabric drying in hot air clothes dryers, and the like are known in the art. Various s.r.a.'s have been commercialized and are currently used in detergent compositions and fabric softener/antistatic articles and compositions. Such s.r.a.'s typically comprise an oligomeric ester "backbone" and one or more "end-capping" units.

While nonionic s.r.a.'s are known in the literature, many of the commercially important s.r.a.'s are anionic. Such anionic s.r.a.'s typically comprise an oligoester backbone which may itself optionally contain various anionic substituents and will usually terminate with one or more end-capping units which are also anionic. For example, various oxy-alkylene/terephthalate/sulfoisophthaloyl oligomers end-capped with sulfoaroyl substituents comprise a known and important class of s.r.a.'s for use in laundry detergents.

Unfortunately, the manufacture of s.r.a.'s having sulfoaroyl end-caps is expensive due to the expense of the sulfoaroyl raw materials. Accordingly, it is of substantial interest to the manufacturers of anionic ester-type s.r.a.'s to find a less expensive type of anionic end-capping unit. It would have appeared that isethionate-derived substituents of the type $—OCH_2CH_2SO_3—$ or poly-ethoxy or propoxy derivatives might be ideal, and less expensive, substitutes for the sulfoaroyl end-capping units. This is particularly true since the terminal hydroxyl groups of this family of hydroxysulfonates can undergo an esterification reaction with the oligomeric ester backbone of the s.r.a. However, it transpires that, during synthesis of s.r.a.'s with isethionate (2-hydroxyethanesulfonate) units or modified poly-ethoxy/propoxy sulfonated end-caps, substantial difficulties can occur due to undesirable crystallization of the s.r.a.'s and/or the end-cap units.

It has now been discovered that the mixtures of sulfonate-type hydrotropes, alkylbenzenesulfonates, or paraffin sulfonates with the soil release oligomer reduces the crystallization problems encountered in certain preferred di-capped s.r.a.'s during manufacture and storage as well as when the s.r.a.'s are introduced to the wash liquor.

It is an object of the present invention to provide novel, less expensive di-capped s.r.a compositions which can be used as inexpensive, effective and product-compatible soil release agents in consumer products having widely varying formulas, such as granular detergent compositions and laundry detergent bars.

These and other objects are secured herein as will be seen from the following disclosure.

BACKGROUND ART

U.S. Pat. No. 4,721,580, Gosselink issued Jan. 26, 1988, discloses soil release oligomeric ester compositions with end-caps having the formula $NaO_3S(CH_2CH_2O)_n$—but without the addition of crystallization-reducing stabilizers. See also U.S. Pat. No. 4,968,451, Scheibel et al.

U.S. Pat. No. 4,764,289, Trinh issued Aug. 16, 1988, discloses dryer-added fabric articles utilizing anionic polymeric soil release agents. See also U.S. Pat. No. 4,818,569.

U.S. Pat. No. 4,877,896, Maldonado et al, issued Oct. 31, 1989, discloses end-capped esters useful as soil release agents in detergent compositions and fabric-conditioner articles comprising terephthalate esters.

U.S. Pat. No. 4,849,257, Brocher, St. et al issued Jul. 18, 1989, discloses the use of various hydrotropes as dispersing aids in dryer-added products. The hydrotropes act to disperse the polymer in the fabric conditioning composition and to stabilize the mixture. See also U.S. Pat. No. 4,863,619 which discloses various fatty acids to reduce the viscosity of soil release polymers for use in dryer-added products.

Types of synthetic and analytical methods useful herein are well illustrated in Odian, *Principles of Polymerization*, Wiley, N.Y., 1981, which is incorporated herein by reference. Chapter 2.8 of the Odian reference, entitled "Process Conditions", pp 102–105, focuses on the synthesis of poly(ethylene terephthalate).

SUMMARY OF THE INVENTION

The present invention encompasses compositions comprising oligomeric, substantially linear, sulfonated poly-ethoxy/propoxy end-capped esters and crystallization-reducing stabilizers and hydrotropes. The esters employed herein comprise oxyethyleneoxy units and terephthaloyl units. Preferred esters additionally comprise units of oxy-1,2-propyleneoxy, sulfoisophthalate and, optionally, poly(oxyethylene)oxy units (with degee of polymerization from 2 to 4). (Mixtures of such esters with reaction by-products and the like retain their utility as fabric soil release agents when they contain at least 10% by weight of said linear end-capped esters.) The esters herein are of relatively low molecular weight (i.e., generally below the range of fiber-forming polyesters) typically ranging from about 500 to about 8,000.

Taken in their broadest aspect, the soil release agents provided by this invention encompass an oligomeric ester "backbone" which is end-capped on one, or preferably both, ends of the backbone by the essential end-capping units.

The soil release agent compositions also comprise certain stabilizers selected from the group consisting of:
1) sulfonate-type hydrotropes selected from the group consisting of:
   a) $(R_1)_nAr-SO_3M$;
   b) $(R_2)Ar(SO_3M)-O-(R_2)Ar(SO_3M)$; and
   c) mixtures thereof, wherein Ar is an aromatic hydrocarbon group, each $R_1$ is a hydrogen radical or a $C_1-C_4$ alkyl group, each $R_2$ is a $C_1-C_{18}$ alkyl group, n is from 0 to 3, and M is an alkali metal or tetraalkylammonium ion;

2) alkali metal and tetraalkylammonium salts of linear and branched alkylbenzenesulfonates wherein the alkykl group is from about $C_5$ to about $C_{16}$, preferably from about to about $C_{13}$;

3) alkyl chain sulfonates including paraffin sulfonates and other thermally-stable alkyl sulfonate variations, such as olefin sulfonates and beta-alkoxysulfonates, with about 4 to about 20 carbon atoms, provided the alkyl sulfonates are substantially free of substituents capable of entering into esterification/transesterification reactions under the conditions used for forming the soil release agents of this invention; and 4) mixtures thereof.

It has been discovered that the stabilizers can be integrated into the soil release agent to reduce the substantial difficulties attributable to undesirable crystallization of the oligomer during preparation and/or after introduction into the wash liquor. Oligomers with high ratios of oxyethyleneoxy to oxy-1,2-propyleneoxy units (EG/PG) in the backbone structure are especially susceptible to crystallization.

The essential end-capping units which comprise the soil release agents herein are anionic hydrophiles derived from sulfonated poly-ethoxy/propoxy groups and connected to the esters by an ester linkage. The preferred end-capping units are of the formula $(MO_3S)(CH_2)_m(CH_2CH_2O)(RO)_n$—wherein N is a salt-forming cation such as sodium or tetraalkylammonium, m is 0 or 1, R is ethylene, propylene, or a mixture thereof, and n is from 0 to 2; and mixtures thereof.

Certain noncharged, hydrophobic aryldicarbonyl units are essential in the backbone unit of the oligoesters herein. Preferably, these are exclusively terephthaloyl units. Other noncharged, hydrophobic dicarbonyl units, such as isophthaloyl, adipoyl or the like, can also be present if desired, provided that the soil release properties of the esters (especially polyester substantivity) are not significantly diminished.

It is also possible optionally to incorporate additional hydrophilic units into the backbone units of said esters. For example, anionic hydrophilic units capable of forming two ester bonds may be used. Suitable anionic hydrophilic units of this specific type are well illustrated by sulfonated dicarbonyl units, such as sulfoisophthaloyl, i.e., $—(O)C(C_6H_3)(SO_3M)C(O)—$ wherein H is a salt-forming cation such as an alkali metal or tetraalkylammonium ion.

Generally, if it is desired to modify the units of the esters, use of additional hydrophilic units is preferable to use of additional noncharged, hydrophobic units.

Thus, preferred esters herein comprise, per mole of said ester:

i) from about 1 to about 2 moles of sulfonated poly-ethoxy/propoxy end-capping units of the formula $(MO_3S)(CH_2)_m(CH_2CH_2O)(RO)_n$—wherein H is a salt-forming cation such as sodium or tetraalkylammonium, m is 0 or 1, R is ethylene, propylene or a mixture thereof, and n is from 0 to 2; and mixtures thereof;

ii) from about 0.5 to about 66 moles of units selected from the group consisting of:
   a) oxyethyleneoxy units;
   b) a mixture of oxyethyleneoxy and oxy-1,2-propyleneoxy units wherein said oxyethyleneoxy units are present in an oxyethyleneoxy to oxy-1,2-propyleneoxy mole ratio ranging from 0.5:1 to about 10:1; and
   c) a mixture of a) or b) with poly(oxyethylene)oxy units wherein said poly(oxyethylene)oxy units have a degree of polymerization of from 2 to 4; provided that when said poly(oxyethylene)oxy units have a degree of polymerization of 2, the mole ratio of poly(oxyethylene)oxy units to total group ii) units ranges from 0:1 to about 0.33:1; and when said poly(oxyethylene)oxy units have a degree of polymerization of 3, the mole ratio of poly(oxyethylene)oxy units to total group ii) units ranges from 0:1 to about 0.22:1; and when said poly(oxyethylene)oxy units have a degree of polymerization of 4, the mole ratio of poly(oxyethylene)oxy units to total group ii) units ranges from 0:1 to about 0.14:1;

iii) from about 1.5 to about 40 moles of terephthaloyl units; and iv) from 0 to about 26 moles of 5-sulfoisophthaloyl units of the formula

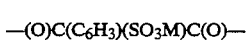

wherein M is a salt forming cation such as an alkali metal or tetraalkylammonium ion.

The end-capping sulfonated poly-ethoxy/propoxy units used in these esters are preferably sodium 2-(2-hydroxyethoxy)ethanesulfonate as in i). Preferred end-capped esters herein are essentially in the doubly end-capped form, comprising about 2 moles of said end-capping units per mole of said ester.

The ester "backbone" of the present soil release agents, by definition, comprises all the units other than the end-capping units; all the units incorporated into the esters being interconnected by means of ester bonds. Preferably, in embodiments wherein the ester "backbones" comprise only terephthaloyl units and oxyethyleneoxy units, the terephthaloyl units iii) ranges from about 1 to about 10 moles per ester. In preferred embodiments incorporating oxy-1,2-propyleneoxy units, the ester "backbone" comprises terephthaloyl units, oxyethyleneoxy, and oxy-1,2-propyleneoxy units; the mole ratio of the latter two types of unit ranging from about 0.5:1 to about 10:1.

In still other highly preferred embodiments, hydrophilic units such as 5-sulfoisophthaloyl are present in the backbone and generally will comprise from about 0.05 to about 26 moles per mole of said ester.

The poly(oxyethylene)oxy units, which aid in the rate of dissolution of the ester, will typically constitute from 0 to about 25 mole percent of total oxyalkyleneoxy units per ester depending upon the degree of polymerization of the poly(oxyethylene)oxy units and the length of the ester backbone.

Soil release agents provided by the invention are well illustrated by one comprising from about 25% to about 100% by weight of ester having the empirical formula

wherein (CAP) represents the sodium salt form of said end-capping units i); (EG/PG) represents said oxyethyleneoxy, oxy-1,2-propyleneoxy, and poly(oxyethylene)oxy units ii); (T) represents said terephthaloyl units iii); x is from about 1 to 2; y is from about 0.5 to about 7; z is from about 1.5 to about 7; wherein x, y, and z represent the average number of moles of the corresponding units per mole of said ester. More preferably in compositions of this type, the oxyethyleneoxy:oxy- 1,2-propyleneoxy mole ratio ranges from about 1:1 to about 10:1; x is about 2, y is from about 1 to about 6, and z is from about 2 to about 6. Most highly preferred of these ester compositions comprise at least 513% by weight of said ester molecules (oligomers) having molecular weights ranging from about 500 to about 5,000.

The soil release agents additionally comprise, in addition to the ester, from about 0.5% to about 20% of sulfonate-type hydrotropes, alkylbenzenesulfonates, or paraffin sulfonate stabilizers. Most highly preferred of these soil release agent compositions comprise at least about 3% by weight of a mixture of said stabilizers.

In the process aspect of the invention, the invention encompasses the preparation of the aforesaid $(CAP)_x$-$(EG/PG)_y(T)_z$ linear esters by a process most preferably comprising reacting dimethyl terephthalate, ethylene glycol, 1,2-propylene glycol, and a compound selected from the group consisting of monovalent cation salts of sulfonated poly-ethoxy/propoxy monomers, in the presence of at least one conventional transesterification catalyst such as tetrabutyl titanate and one or more crystallization-reducing stabilizer or hydrotrope. The resulting water-soluble or dispersible ester mixtures are used as fabric soil release materials. Additional reactants can be selected from the group consisting of diethylene glycol, triethylene glycol, tetraethylene glycol, and mixtures thereof.

As disclosed hereinabove, the backbone of the esters herein are preferrably modified by incorporation of hydrophiles such as 5-sulfoisophthalate. This provides compositions such as those comprising from about 25 to about 100% by weight of ester having the empirical formula $$(CAP)_x(EG/PG)_y(T)_z(SIP)_q$$

wherein (CAP), (EG/PG), and (T) are as defined above and (SIP) represents the sodium salt form of said 5-sulfoisophthaloyl units iv); x is from about 1 to 2; y is from about 0. 5 to about 66; z is from about 1.5 to about 40; q is from about 0.05 to about 26; the oxyethyleneoxy: oxy-1,2-propyleneoxy mole ratio ranges from about 0.5:1 to about 10:1; wherein x, y, z and q represent the average number of moles of the corresponding units per mole of said ester.

More preferably in compositions of this type, x is about 2, y is from about 3 to about 18, z is from about 3 to about 15, and q is from about 0.5 to about 4. In the most highly preferred soil release agents, x is about 2, y is about 5, z is about 5, and q is about 1.

Excellent soil release compositions are those wherein at least about 50% by weight of said ester has a molecular weight ranging from about 500 to about 5,000 and at least about 3% of said crystallization-reducing stabilizer.

In a preferred synthesis and composition in accordance with the above defined numbers of units, water-soluble or dispersible ester mixtures are prepared by reacting dimethyl terephthalate or terephthalic acid, ethylene glycol, 1,2-propylene glycol, a dimethyl 5-sulfoisophthalate monovalent cation salt or 5-sulfoisophthalic acid, monovalent salt, and a monohydroxy compound selected from the group consisting of monovalent cation salts of sulfonated poly-ethoxy/propoxy monomers, in the presence of at least one conventional esterification/transesterification catalyst and one or more above listed stabilizers.

The present invention also encompasses granular or bar detergent compositions comprising detersive surfactants and soil release agents. The detergent compositions can optionally comprise detergent builders and other conventional detersive ingredients.

The detersive surfactants employed in the fully-formulated detergent compositions afforded by the present invention can vary from about 1% to about 99.8% by weight of detergent composition depending upon the particular surfactants used and the effects desired. Preferably, the detersive surfactants comprise from about 5% to about 80% by weight of the composition and can be nonionic, anionic, zwitterionic, cationic, or mixtures thereof. Optional ingredients include non-phosphorus builder systems, phosphorus containing builders, zeolite builders, bleaches, enzymes, dye transfer inhibiting agents, dispersants, fabric softeners, processing aids and brighteners. The soil release agents will typically constitute at least 0.1%, preferably from about 0.1% to about 10%, most preferably from about 0.2% to about 3.0%, by weight of a detergent composition.

Methods of laundering fabrics and providing soil release finish thereto are also included in this invention. The preferred method of laundering involves contacting the fabrics with an aqueous wash liquor comprising the soil release agent in a detergent composition for about 5 minutes to about 1 hour. The fabrics can then be rinsed with water and line- or tumble- dried.

All percentages, ratios, and proportions herein are on a weight basis unless otherwise indicated. All documents cited are incorporated herein by reference.

DETAILED DESCRIPTION OF THE INVENTION

The present invention encompasses novel compositions suitable for use in consumer fabric care products such as granular detergents. The essential component of the compositions is a particular kind of ester characterized by certain essential end-capping units as well as other essential units all in particular proportions and having structural arrangements as described hereinafter.

The following structure is illustrative, but by no means limiting, of preferred structures of ester molecules of the invention:

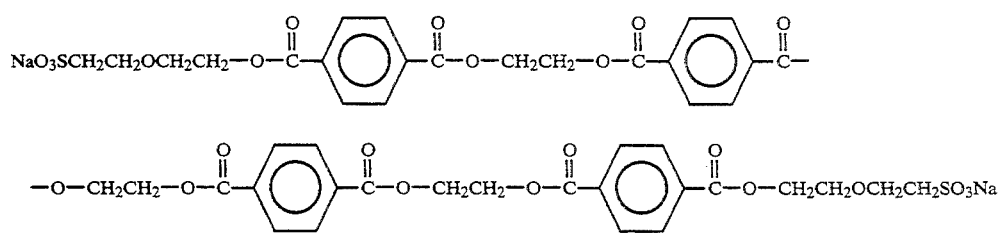

Also encompassed are certain stabilizers which reduce the crystallization problems encountered during manufacture and storage of the soil release oligomers as well as when introduced to the wash liquor. The stabilizers are especially useful in compositions with high ratios of oxyethyleneoxy to oxy-1,2-oxypropylene in the "backbone" structure of the ester.

The esters herein can be simply characterized as oligomers which comprise a substantially linear ester "backbone" and end-capping units which are derived from sulfonated monohydroxy polyethoxy/propoxy monomers, especially 2-(2-hydroxyethoxy)ethanesulfonate. Proper selection of the structural units which comprise the ester backbone and use of sufficient amounts of the sulfonated end-capping units results in the desired soil-release properties of these materials. The integration of stabilizers into the oligomer reduces the crystallization of the oligomer during manufacture and when introduced into the wash liquor, thereby enhancing the dissolution/dispersion and the soil release performance of the esters.

Oligomeric Esters—It is to be understood that the compositions herein are not resinous, high molecular weight, macromolecular or fiber-forming polyesters but, instead, are relatively low molecular weight and contain species more appropriately described as oligomers rather than as polymers. Individual ester molecules herein, including the end-capping units, can have molecular weights ranging from about 500 to about 8,000. Relevant for purposes of comparison with glycol-terephthalate fibrous polyesters (typically averaging 15,000 or more in molecular weight) is the molecular weight range from about 500 to about 5,000, within which molecules of the preferred esters of the invention which incorporate the essential units and 5-sulfoisophthalate are generally found. Accordingly, the compositions of this invention are referred to as "oligomeric esters" rather than "polyester" in the colloquial sense of that term as commonly used to denote high polymers such as fibrous polyesters.

Molecular Geometry—The esters employed herein are all "substantially linear" in the sense that they are not significantly branched or crosslinked by virtue of the incorporation into their structure of units having more than two ester-bond forming sites. (By constrast, a typical example of polyester branching or crosslinking of the type excluded in defining esters of the present invention, see Sinker et al, U.S. Pat. No. 4,554,328, issued Nov. 19, 1985.) Furthermore, no cyclic esters are essential for the purposes of the invention but may be present in the compositions of the invention at low levels as a result of side-reactions during ester synthesis. Preferably, cyclic esters will not exceed about 2% by weight of the compositions; most preferably, they will be entirely absent from the compositions.

Contrasting with the above, the term "substantially linear" as applied to the esters herein does, however, expressly encompass materials which contain side-chains which are unreactive in ester-forming or transesterification reactions. Thus, oxy-1,2-propyleneoxy units are of an unsymmetrically substituted type; their methyl groups do not constitute what is conventionally regarded as "branching" in polymer technology (see Odian, Principles of Polymerization, Wiley, N.Y., 1981, pages 18–19, with which the present definitions are fully consistent) and are unreactive in ester-forming reactions. Optional units in the esters of the invention can likewise have side-chains, provided that they conform with the same nonreactivity criterion.

Molecular Structures—The following structures are illustrative of structures of ester molecules falling within the foregoing preferred embodiments, and demonstrate how the units are connected:

a) doubly end-capped ester molecule comprised of the essential units i), ii) and iii);

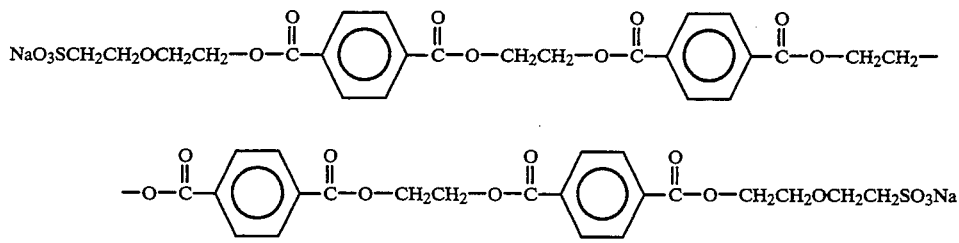

b) singly end-capped ester molecule comprised of essential units i), ii) and iii);

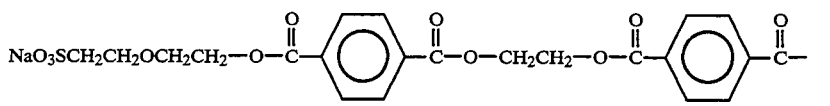

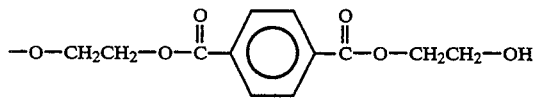

c) doubly end-capped ester molecule, (termed a "hybrid backbone" ester molecule herein) comprised of essential units i), ii) and iii). Units ii) are a mixture of oxyethyleneoxy and oxy-1,2-propyleneoxy units, in the example shown below at a 2:1 mole ratio (on average, in ester compositions as a whole in contrast to individual molecules such as illustrated here, ratios ranging from about 1:1 to about 10:1 are the most highly preferred when the compositions are based on the units i), ii) and iii));

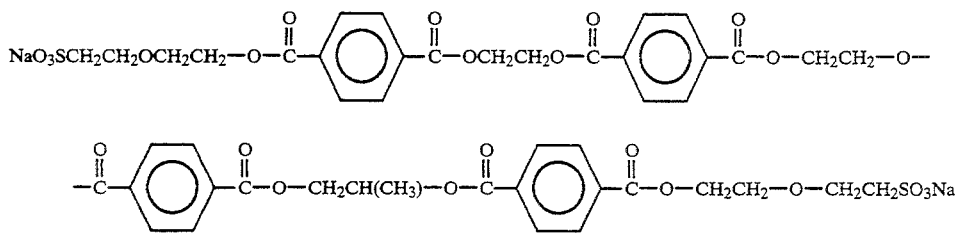

d) doubly end-capped ester molecule comprised of essential units i), ii) and iii), together with an optional unit iv). On average, in ester compositions as a whole in contrast to individual molecules such as illustrated below, the most highly preferred ratios of oxyethyleneoxy to oxy-1,2-propyleneoxy units range from about 0.5:1 to 1:0 when the compositions are based on units i), ii), iii), and iv);

Any ester molecules which are present in compositions of the invention which are not fully, i.e., doubly, end-capped by the end-capping units must terminate with units which are not sulfonated poly-ethoxy-/propoxy end-capping units. These termini will typically be hydroxyl groups or other groups attributable to the unit-forming reactant. For example in the structure b) above, a chain terminal position to which is attached

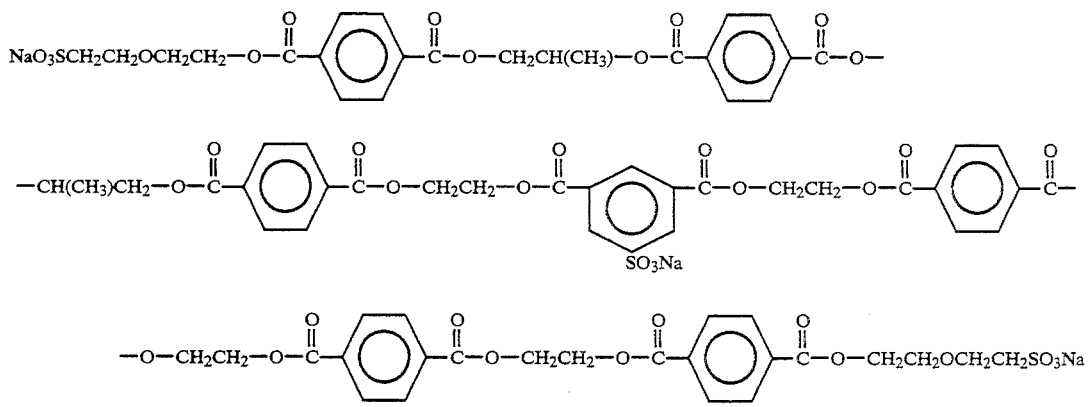

In the context of the structures of ester molecules disclosed herein it should be recognized that the present invention encompasses not only the arrangement of units at the molecular level but also the gross mixtures of esters which result from the reaction schemes herein and which have the desired range of composition and properties. Accordingly, when the number of monomer units or ratios of units are given, the numbers refer to an average quantity of monomer units present in oligomers of the composition.

Ester Backbone—As illustrated in the structures shown above, in the esters of this invention, the backbone is formed by oxyethyleneoxy and terephthaloyl units connected in alternation. Optionally, the backbone is formed by 5-sulfoisophthaloyl units, terephthaloyl units, oxyethyleneoxy or mixtures of oxyethyleneoxy, oxypropyleneoxy and poly(oxyethyleneoxy) units connected with alternation of the aryldicarbonyl and oxyalkyleneoxy units.

Groups at the Termini of the Ester Backbone—Likewise, the "esters of the invention" is a term which encompasses the novel doubly and singly end-capped compounds disclosed herein, mixtures thereof, and mixtures of said end-clapped materials which may unavoidably contain some non-capped species. Although, levels of the latter will be zero or at a minimum in all of the highly preferred compositions. Thus, when referring simply to an "ester" herein it is intended to refer, by definition, collectively to the mixture of sulfonated capped and uncapped ester molecules resulting from any single preparation.

—H forms a hydroxyl group. In other structures which may be constructed, units such as —(O)CChdH4.C(O)—OCH3 may be found in terminal positions. All the most highly preferred ester molecules herein will, however, as indicated above, have two sulfonated end-capping units and no backbone units occupying terminal positions.

Symmetry—It is to be appreciated that in esters in which oxy-1,2-propyleneoxy units are also present, the oxy-1,2-propyleneoxy units can have their methyl groups randomly alternating with one of the adjacent —CH2—hydrogen atoms, thereby lowering the symmetry of the ester chain. Thus, the oxy-1,2-propyleneoxy unit can be depicted as having either the —OCH2CH(CH3)O—orientation or as having the opposite —OCH(CH3)CH2O—orientation. Carbon atoms in the oxy-1,2-propylene units to which the methyl groups are attached are, furthermore, asymmetric, i.e., chiral; they have four nonequivalent chemical entities attached.

In contrast to the oxy-1,2-propyleneoxy units, oxyethyleneoxy units cannot be used herein as a sole source of oxy-1,2-alkyleneoxy units without the addition of stabilizers since they lack the needed unsymmetrical character. It is the presence of the unsymmetrical units and/or of the stabilizers that inhibit the crystallization of the oligomer during manufacture and later when added to the wash liquor. The use of oxyethyleneoxy units or high ratios of oxyethyleneoxy to oxypropyleneoxy units, therefore, must be accompanied by the use of stabilizers to retard the formation of crystals.

Accordingly, such compositions herein contain sulfonate-type hydrotropes, linear or branched alkylbenzenesulfonates, paraffin sulfonates, and mixtures thereof integrated into the oligomer composition.

Preferably, various optional units of a hydrophilicity-enhancing and nonpolyester substantive type can be incorporated into the esters. The pattern of such incorporation will generally be random. Preferred optional units are anionic hydrophiles, such as 5-sulfoisophthaloyl or similar units. Such units will, when incorporated into the ester backbone, generally divide it into two or more hydrophobic moieties separated by one or more hydrophilic moieties.

It should also be noted that the essential non-charged aryldicarbonyl units herein need not exclusively be terephthaloyl units, provided that the polyester fabric-substantivity of the ester is not harmed to a significant extent. Thus, for example, minor amounts of isomeric non-charged dicarbonyl units, such as isophthaloyl or the like, are acceptable for incorporation into the esters.

Poly(oxyethylene)oxy Units—The optional poly(oxyethylene)oxy units comprising the esters of the present invention have a degree of polymerization of from 2 to 4 and can constitute from 0 to about 25 mole percent of the total oxyalkyleneoxy units present. Preferably, poly(oxyethylene)oxy units are present when the backbone unit comprises 8 or more terephthaloyl units; however, at least some poly(oxyethylene)oxy units may be present in esters with as few as 1.5 terephthaloyl units. The poly(oxyethylene)oxy units, especially in esters with 8 or more terephthaloyl units, aid in the rate of dissolution of the soil release agent into the wash liquor.

The amount of poly(oxyethylene)oxy units present in the backbone is related to its degree of polymerization. For example, oxyethyleneoxyethyleneoxy units (formed from diethylene glycol), which have a degree of polymerization of two, can constitute from 0 to 25 mole percent of the total oxyalkyleneoxy units in the backbone. Oxyethyleneoxyethyleneoxyethyleneoxy units (formed from triethylene glycol), which have a degree of polymerization of three, can constitute from 0 to 18 mole percent of the total oxyalkyleneoxy units in the backbone. Oxyethyleneoxyethyleneoxy-ethyleneoxyethyleneoxy units (formed from tetraethylene glycol), which have a degree of polymerization of four, can constitiue from 0 to 12 mole percent of the total oxyalkyleneoxy units present in the backbone.

End-Capping Units—The end-capping units used in the esters of the present invention are sulfonated polyethoxy/propoxy groups. These end-cap units provide anionic charged sites when the esters are dispersed in aqueous media, such as a laundry liquor. The end-caps serve to assist transport in aqueous media and to provide hydrophilic sites on the ester molecules.

It is not intended to exclude the acid form, but most generally the esters herein are used as sodium salts, as salts of other alkali metals, as salts with nitrogen-containing cations (especially tetraalkylammonium), or as the disassociated ions in an aqueous environment.

Examples of end-capping groups include sodium isethionate, sodium 2-(2-hydroxyethoxy)ethanesulfonate, sodium 2-[2-(2-hydroxyethoxy)ethoxy]ethanesulfonate, sodium 5-hydroxy-4-methyl-3-oxa-pentanesulfonate, sodium alpha-3-sulfopropyl-omega-hydroxy-poly-(oxy-1,2-ethanediyl) (with average degree of ethoxylation of 1-2), sodium 5-hydroxy-3-oxa-hexanesulfonate, and mixtures thereof.

On a mole basis, the compositions herein will preferably comprise from about one to about two moles of the sulfonated end-capping units per mole of the ester. Most preferably, the esters are doubly end-capped; i.e., there will be two moles of end-capping units present per mole of the esters. From the viewpoint of weight composition, it will be clear that the fractional contribution of end-capping units to the molecular weight of the esters will decrease as the molecular weight of the ester backbone increases.

Stabilizers—Stabilizers useful in this invention should be water soluble or water dispersable. The stabilizing agents that are useful herein include sulfonate-type hydrotropes, linear or branched alkylbenzenesulfonates, paraffin sulfonates, and other thermally-stable alkyl sulfonate variations with from about 4 to about 20 carbon atoms. Preferred agents include sodium dodecylbenzenesulfonate, sodium cumenesulfonate, sodium toluenesulfonate, sodium xylenesulfonate, and mixtures thereof. When higher levels of stabiliers are used, mixtures of hydrotropes and/or other stabilizers are preferred over pure components to insure full integration into the oligomer and to reduce the possibility of crystallization of the stabilizer.

In general, the level of such agents should be kept as low as possible while providing the primary benefit, ie., the reduction in the amount of crystallization that the soil release agent undergoes during manufacture, storage and when introduced to the wash liquor. The composition may comprise from about 0.5% to about stabilizer. Most preferably, these ester compositions comprise an amount sufficient to reduce the crystallization of the oligomer during manufacture and when introduced to the wash liquor, ie., at least 3% by weight.

The stabilizers may be added to the soil release agent in various ways. Preferably, the stabilizers are added to the oligomer reagents in the initial stages prior to full oligomerization. The stabilizers thereby integrate uniformly into the oligomer. Another method would entail first melting the pre-formed oligomer and then uniformly mixing the stabilizer into the molten oligomer.

Alkylbenzenesulfonates when used as surfactants in detergent compositions do not provide the stabilizing and crystallization-reducing effect, even during dissolution of the soil release agent in the laundry liquor, that the stabilizer does when it is added as directed above.

Method for Making End-Capped Esters—The ester compositions of the present invention can be prepared using any one or combination of several alternative general reaction types, each being well-known in the art. Many different starting materials and diverse, well-known experimental and analytical techniques are useful for the syntheses.

Mechanistically, the suitable general reaction types for preparing esters of the invention include those classifiable as:

1. alcoholysis of acyl halides;
2. esterification of organic acids;
3. alcoholysis of esters (transesterification); and
4. reaction of alkylene carbonates with organic acids.

Of the above, reaction types 2–4 are highly preferred since they render unnecessary the use of expensive solvents and halogenated reactants. Reaction types 2 and 3 are especially preferred as being the most economical.

Suitable starting materials or reactants for making the esters of this invention are any reactants (especially esterifiable or transesterifiable reactants) that are capable of combining in accordance with the reaction types 1–4, or combinations thereof, to provide esters having the correct proportions of all the above-specified units (i) to (iv) of the esters. Such reactants can be categorized as "simple" reactants, i.e., those that are singly capable of providing only one kind of unit necessary for making the esters, or as derivatives of the simple reactants which singly contain two or more different types of unit necessary for making the esters. Illustrative of the simple kind of reactant is dimethyl terephthalate which can provide only terephthaloyl units. In contrast, bis(2-hydroxypropyl)terephthalate is a reactant which can be prepared from dimethyl terephthalate and 1,2-propylene glycol and which can desirably be used to provide two kinds of unit, viz. oxy-1,2propyleneoxy and terephthaloyl, for making the esters herein.

In principle it is also possible to use oligoesters, or polyesters such as poly(ethylene terephthalate), as reactants herein and to conduct transesterification with a view to incorporation of end-capping units while decreasing molecular weight. Nonetheless, the more highly preferred procedure is to make the esters from the simplest reactants in a process involving molecular weight increase (to the limited extent provided for by the invention) and end-capping.

Since "simple" reactants are those which will most preferably and conveniently be used, it is useful to illustrate this kind of reactant in more detail. Thus, 2-(2-hydroxyethoxy)ethanesulfonate can be used as the source of the essential end-capping units herein; additional examples of such reactants are 2-[2-(2-hydroxyethoxy)ethoxy]ethanuesulfonate, 5-hydroxy-4-methyl-3-oxapentanesulfonate, and sodium 5-hydroxy-3-oxahexanesulfonate. (Note that the metal cation can be replaced by potassium or a nitrogen-containing cation provided that the cation does not overly promote crystallization of the oligomer and is unreactive during the synthesis, e.g. tetraalkylammonium. It is, of course possible to subject any of the esters of the invention to cation exchange after the synthesis and, thereby, affording a means of introducing more esoteric or reactive cations into the ester compositions).

Appropriate glycols or cyclic carbonate derivatives thereof can be used to provide oxy-1,2-alkyleneoxy units; thus, 1,2-propylene glycol or (where the starting carboxyl groups are present in an acidic form) the cyclic carbonate

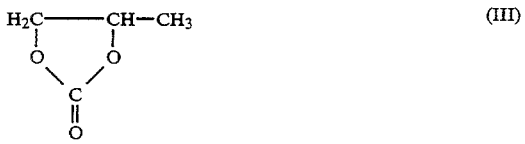

(III)

are suitable sources of oxy-1,2-propyleneoxy units for use herein. Oxyethyleneoxy units are most conveniently provided by ethylene glycol. Although as an alternative, ethylene carbonate could be used when free carboxylic acid groups are to be esterified.

Poly(oxyethylene)oxy units are most conveniently provided by diethylene glycol, triethylene glycol, tetraethylene glycol, and mixtures thereof. Additionally, minor amounts of poly(oxyethylene)oxy may be formed as a side reaction in the ester synthesis. The quantity of each unit formed would be inversely related to the degree of polymerization of the unit. Only trace amounts of poly(oxyethylene)oxy units with a degree of polymerization of above 6 would be expected.

Aryldicarboxylic acids or their lower alkyl esters can be used to provide the essential aryldicarbonyl units; thus, terephthalic acid or dimethyl terephthalate are suitable sources of terephthaloyl units.

Units of the esters, which are optional in the invention as broadly defined, will be provided by well-known and readily identifiable reagents; for example, dimethyl 5-sulfoisophthalate, sodium salt, is an example of a reagent capable of providing 5-sulfoiso-phthaloyl units for optional incorporation into the esters of the invention. It is generally preferred that all units of the type (iv) as defined hereinabove should be provided by reactants in ester or dicarboxylic acid forms.

When starting with the simplest reactants as illustrated above, the overall synthesis is usually multi-step and involves at least two stages, such as an initial esterification or transesterification (also known as ester interchange) stage followed by an oligomerization stage in which molecular weights of the esters are increased, but only to a limited extent as provided for by the invention.

Formation of ester-bonds in reaction types 2 and 3 involves elimination of low molecular weight by-products such as water (reaction 2) or simple alcohols (reaction 3). Complete removal of the latter from reaction mixtures is generally somewhat easier than removal of the former. However, since the ester-bond forming reactions are generally reversible, it is necessary to "drive" the reactions forward in both instances by removing these by-products.

In practical terms, in the first stage (ester interchange) the reactants are mixed in appropriate proportions and are heated to provide a melt at atmospheric or slightly superatmospheric pressures (preferably of an inert gas such as nitrogen or argon). Water and/or low molecular weight alcohol is liberated and is distilled from the reactor at temperatures up to about 200° C. (A temperature range of from about 150°–200° C. is generally preferred for this stage).

In the second (i.e., oligomerization) stage, vacuum and temperatures somewhat higher than in the first stage are applied; removal of volatile by-products and excess reactants continues until the reaction is complete, as monitored by conventional spectroscopic techniques. Continuously applied vacuum, typically of about 30 mm Hg or lower, can be used. Addition of a small amount of an anti-foam agent, such as a silicone oil or mineral oil can be employed to control foaming during the vacuum oligomerization step, particularly with stabilizers such as alkyl benzenesulfonate.

In both of the above-described reaction stages, it is necessary to balance on one hand the desire for rapid and complete reaction (higher temperatures and shorter times preferred), against the need to avoid thermal degradation (which undesirably might result in off-colors and by-products). It is possible to use generally higher reaction temperatures especially when reactor design minimizes super-heating or "hot spots"; also, ester-forming reactions in which ethylene glycol is present are more tolerant of higher temperatures. Thus, a suitable temperature for oligomerization lies most preferably in the range of from about 150° C. to about 260° C. when higher ratios of EG/PG are present and in the range of from about 150° C. to about 240° C. when lower ratios of EG/PG are present (assuming that no special precautions, such as of reactor design, are otherwise taken to limit thermolysis). When tetraalkylammonium cations are present, condensation temperatures are preferably 150°–240° C.

It is very important in the above-described procedure to use continuous mixing so that the reactants are always in good contact; highly preferred procedures involve formation of a well-stirred homogeneous melt of the reactants in the temperature ranges given above. It is also highly preferred to maximize the surface area of reaction mixture which is exposed to vacuum or inert gas to facilitate the removal of volatiles, especially in the oligomerization step; mixing equipment of a high-shear vortex-forming type giving good gas-liquid contact are best suited for this purpose.

Catalysts and catalyst levels appropriate for esterification, transesterification, oligomerization, and for combinations thereof are all well-known in polyester chemistry and will generally be used herein; as noted above, a single catalyst will suffice. Suitable catalytic metals are reported in Chemical Abstracts, CAB3:178505v, which states that the catalytic activity of transition metal ions during direct esterification of K and Na carboxybenzenesulfonates by ethylene glycol decreases in the order Sn (best), Ti, Pb, Zn, Mn, Co (worst).

The reactions can be continued over periods of time sufficient to guarantee completion, or various conventional analytical monitoring techniques can be employed to monitor progress of the forward reaction; such monitoring makes it possible to speed up the procedures somewhat and to stop the reaction as soon as a product having the minimum acceptable composition is formed. In general, when tetraalkylammonium cations are present, it is preferred to stop the reaction at less than full completion, relative to the sodium cation form, to reduce the possibility of thermal instability. Appropriate monitoring techniques include measurement of relative and intrinsic viscosities, hydroxyl numbers, $^1$H and $^{13}$C nuclear magnetic resonance (n.m.r) spectra, capillary zone electrophoresis, and liquid chromatograms.

Most conveniently, when using a combination of volatile reactants (such as a glycol) and relatively involatile reactants (such as dimethyl terephthalate), the reaction will be initiated with excess glycol being present. As in the case of ester interchange reactions reported by Odian (op. cit.), "stoichiometric balance is inherently achieved in the last stages of the second step of the process". Excess glycol can be removed from the reaction mixture by distillation; thus, the exact amount used is not critical.

Inasmuch as the final stoichiometry of the ester compositions depends on the relative proportions of reactants retained in the reaction mixtures and incorporated into the esters, it is desirable to conduct the condensations in a way which effectively retains the non-glycol reactants and prevents them from distilling or subliming. Dimethyl terephthalate and to a lesser extent the simple glycol esters of terephthalic acid have sufficient volatility to show on occasion "sublimation" to cooler parts of the reaction apparatus. To ensure achieving the desired stoichiometry it is desirable that this sublimate be returned to the reaction mixture or, alternatively, that sublimation losses be compensated by use of a small excess of terephthalate. In general, sublimation-type losses, such as of dimethyl terephthalate, may be minimized 1) by apparatus design; 2) by raising the reaction temperature slowly enough to allow a large proportion of dimethyl terephthalate to be converted to less volatile glycol esters before reaching the upper reaction temperatures; 3) by conducting the early phase of the transesterification under low to moderate pressure (especially effective is a procedure allowing sufficient reaction time to evolve at least about 90% of the theoretical yield of methanol before applying vacuum); 4) by controlling vacuum during condensation to avoid use of pressures below about 20 mm Hg until the condensation has progressed to the point that most of the terephthalate is beyond the monomeric stage. On the other hand, the "volatile" glycol components used herein must be truly volatile if an excess is to be used. In general, lower glycols or mixtures thereof having boiling points below about 350° C. at atmospheric pressure are used herein; these are volatile enough to be practically removable under typical reaction conditions.

Typically herein, when calculating the relative proportions of reactants to be used, the following routine is followed as illustrated for a combination of the reactants sodium 2-(2-hydroxy ethoxy)ethanesulfonate (A), ethylene glycol (B), dimethyl terephthalate (C), and dimethyl 5-sodiosulfoisophthalate (D):

1. the desired degree of end-capping is selected; for the present example, the value 2, most highly preferred according to the invention, is used;
2. the average calculated number of terephthaloyl units in the backbone of the desired ester is selected; for the present example, the value 5, which falls in the range of most highly preferred values according to the invention, is used;
3. the average calculated number of 5-sulfoisophthaloyl units in the backbone of the desired ester is selected; for the present example, the value 1, which falls in the range of most highly preferred values according to the invention, is used;
4. the mole ratio of (A) to (C) to (D) should thus be 2:5:1; amounts of the reactants (A), (C), and (D) are taken accordingly;
5. an appropriate excess of glycol is selected; typically 2 to 10 times the sum of the number of moles of dimethyl sulfoisophthalate and dimethyl terephthalate is suitable.

The glycol used will be calculated in an amount sufficient to allow interconnection of all other units by means of ester bonds. Adding a convenient excess will usually result in a total relative amount of glycol ranging from about I to about 10 moles for each mole non-glycol organic reactants added together.

The sulfonate-type hydrotropes, linear or branched alkylbenzenesulfonates, and paraffin sulfonate stabilizers may be added to the oligomer at various stages prior to full oligomerization or by first melting the preformed oligomer and then homogeneously mixing the stabilizer into the molten oligomer. The key is to create a uniform integration of the stabilizer into the oligomer.

In light of the teaching of the present invention (insofar as the identity and proportions of essential end-capping and backbone units are concerned), numerous syntheses of ester compositions according to the invention follow straightforwardly from the above disclosure. The following, more detailed examples are illustrative.

EXAMPLE I

Synthesis of Sodium 2-(2-hydroxyethoxy)ethanesulfonate—A 1 liter, 3-neck, round-bottom flask equipped with magnetic stirring bar, pH probe, thermometer attached to a Therm-O-Watch TM ($I^2$R), and an inert gas inlet through a condenser is charged with 400 g of distilled water. This is deoxygenated by bubbling inert gas through the water for 30 minutes while stirring vigorously. To this is added sodium hydroxide (40.0 g, 1.00 mol, Mallinckrodt). When the solution is homogeneous, a glass inlet tube with a fritted glass end is placed into the solution through a Clasien head while maintaining the inert atmosphere in the system. The pH is above 11. Sulfur dioxide gas (Air Products Co.) is bubbled into the basic solution at ca. 0.02 mol per minute. When the pH of the solution drops to 4.0 in ca. 1 hr, the $SO_2$ addition is stopped. The temperature of the solution is raised to ca. 85° C. and held there. Inert gas is used to flush the delivery tube free of residual $SO_2$. Ethylene oxide (Wright Brothers Corp.) is then bubbled through the hot, pale yellow aqueous solution at a rate of ca. 0.02–0.03 mol per minute. Conversion of the sulfite to isethionate is monitored by iodometric titration of 0.50 ml aliquots of the reaction. The pH of the solution slowly rises as the sulfite reacts. Only after ca. 98% of the sulfite is consumed does the reaction mixture become mildly alkaline. At the very end, when the titration indicates that essentially no sulfite remains, the pH rises to 9. At this point, the addition of ethylene oxide is stopped. The pH of the clear solution is adjusted back down to ca. pH 5 by the addition of a small amount of 5 M sulfuric acid. This adjustment of pH is repeated as needed until the pH stabilizes (usually after a few minutes). At this point any tiny residual of sulfite may be discharged by adding a corresponding amount of 30% $H_2O_2$ to oxidize it to sulfate. (Alternatively, any sulfite residual may be oxidized after conversion to sodium 2-(2-hydroxy-ethoxy)ethanesulfonate.) The resulting isethionate solution may be used directly for conversion to modified isethionates.

Conversion of the isethionate solution into sodium 2-(2-hydroxyethoxy)ethanesulfonate is accomplished by adding sodium hydroxide (4.00 g, 0.10 mol, Mallinckrodt) and ethylene glycol (260 g, 5.9 mol, Baker Chemical Co.). While maintaining the inert atmosphere, the pH probe is removed and replaced by a modified Claisen head to distill out the water. The temperature is gradually raised to ca. 195° C. as water distills and then is held for ca. 20 hr as additional water of reaction distills out. The reaction mixture is neutralized to pH 7 with methanesulfonic acid. This yields 407.9 g of stock solution which partially crystallizes at room temperature. This may be used directly for oligomer preparations or if it is desired to isolate the 2-(2-hydroxyethoxy)ethanesulfonate, a trace of monobasic potassium phosphate (approximately 1 mole % of the 2-(2-hydroxyethoxy)ethanesulfonate salt) is added as a buffer and the excess ethylene glycol is stripped off on a Kugelrohr apparatus under vacuum. Alternatively, the next higher homolog, 2-[2-(2-hydroxyethoxy)ethoxy]ethanesulfonate is prepared from the sodium isethionate by reacting it with an excess of diethylene glycol under the same conditions used for the reaction with ethylene glycol. Excess diethylene glycol is then removed by vacuum stripping to give the desired hydroxysulfonate.

EXAMPLE II

Synthesis of Sodium 5-hydroxy-4-methyl-3-oxapentanesulfonate and sodium 5-hydroxy-3-oxa-hexanesulfonate mixture—Into a 1 liter, three neck, round bottom flask fitted with an internal thermometer, short distilling head, magnetic stirring bar, and argon inlet, are placed 85.1 g of isethionic acid, sodium salt (0.60 mol, Aldrich), 457.3 g of 1,2-propanediol (6.0 mol, Mallinckrodt), and 2.9 g of sodium hydroxide (0.072 mol). The initially heterogeneous mixture is heated to 175° C. for about 45 hours during which time it becomes clear and has produced 13.4 g of distillate. The solution is cooled and diluted to 950 ml with distilled water. The pH is adjusted to 7.0 with 1N HCL and the system is buffered with $KH_2PO_4$ at about 1% molar relative to the sulfonate. Water and excess propanediol are then removed on the rotary evaporator and then on a Kugelrohr apparatus at a temperature of 150° C. and about 1 torr. for about 4 hr. This produces 112.5 g of the desired sulfoethoxypropanol mixture.

EXAMPLE III

Synthesis of Sodium Alpha-3-Sulfopropyl-Omega-Hydroxy-Poly-(oxy-1,2-ethanediyl), with Average Degree of Ethoxylation of 2—To a 500 ml, three-neck round bottom flask equipped with a stirrer and condenser is added sodium bisulfite (Baker, 91.1 g, 0.876 mol) and 250 ml of water. After all of the salt has dissolved, sodium hydroxide is added (Aldrich, 8.1 g, 0.202 mol), followed by alpha-2-propenyl-omega-hydroxy-poly(oxy-1,2-ethanediyl) (100.0 g, 0.674 mol with average degree of ethoxylation of 2) (made by ethoxylating allyl alcohol to an average degree of about 1.2 followed by stripping of unethoyxlated allyl alcohol), sodium persulfate (Aldrich, 6.4 g, 0.027 mol), and iron sulfate heptahydrate (Aldrich, 0.15 g, 0.00054 mol), respectively. After the solution has been stirring for two hours, an additional 7.3 g (0.031 mol) of sodium persulfate is added, and the solution is stirred overnight at room temperature. A $^{13}C$-NMR($D_2O$) shows the presence of residual peaks for allyl ethoxylate at $\sim 117$ ppm and $\sim 134.5$ ppm. An additional 6.3g (0.026 mol) of sodium persulfate is added. The solution turns red at this point, and the pH has decreased to $\sim 3$. The reaction mixture is adjusted to about pH 7 with sodium hydroxide (50% in water) and is stirred for an additional 3 hours. A $^{13}C$-NMR($D_2O$) shows the completeness of the reaction by the disappearance of the allyl ethoxylate peaks and the emergence of product peaks at $\sim 24.6$ ppm ($\underline{C}H_2CH_2SO_3Na$) and $\sim 48.2$ ppm ($\underline{C}H_2SO_3Na$), and with the retention of the peak at $\sim 60.8$ ppm ($\underline{C}H_2OH$). Small peaks for sulfinate-sulfonate functionality [$-OCH_2CH(SO_2Na)CH_2SO_3Na$] are also visible at $\sim 44.4$ ppm and $\sim 62.9$ ppm. Hydrogen peroxide (Aldrich, 39.7 g of a 30% solution in water, 0.35 mol) is added to the solution to oxidize the small amount of sulfinate-sulfonate to a disulfonate and the excess bisulfite to bisulfate. The solution becomes acidic (pH 5) and is neutralized with sodium hydroxide. The solution is stirred overnight at room temperature. A $^{13}C$-NMR($D_2O$) shows that the small sulfinate-sulfonate peak at $\sim 44.3$ ppm has disappeared, and a small disulfonate peak at $\sim 56.9$ ppm has appeared. Peroxide indicator paper shows an excess of hydrogen peroxide. A small amount of platinum (IV) oxide is added, and the solution is stirred at room temperature for three days to decompose the excess peroxide. The reaction mixture is then gravity filtered and water is removed under aspirator vacuum on a rotary evaporator at $\sim 60°$ C. to precipitate the inorganic salts. Methanol ($\sim 1$ volume) is added with mixing to form a slurry and the mixture is filtered. The filtrate is heated on the rotary evaporator at $\sim 60°$ C. for 4 hours to afford 120 g of the desired sulfopropanol diethoxylate as a white waxy solid. It is used without further purification as a capping monomer for preparation of polymers.

EXAMPLE IV

An ester composition made from sodium 2-(2-hydroxyethoxy)ethanesulfonate, dimethyl terephthalate, dimethyl 5-sulfoisophthalate, sodium salt, ethylene glycol, and propylene glycol. The example illustrates a generally useful synthesis of preferred doubly end-capped esters of the invention with the integration of 12% by weight of sulfonate hydrotropes.

To a 250 ml, three neck, round bottom flask equipped with a magnetic stirring bar, modified Claisen head, condenser (set for distillation), thermometer, and temperature controller (Therm-O-Watch TM, I$^2$R) is added sodium 2-(2-hydroxyethoxy)ethane-sulfonate (25.0 g, 0.130 mol)(prepared as in Example I), dimethyl terephthalate (Aldrich, 19.3 g, 0.260 mol), dimethyl 5-sulfoisophthalate, sodium salt (Aldrich, 19.3 g, 0.065 mol), ethylene glycol (Baker, 71.1 g, 1.15 mol), propylene glycol (Baker, 85.0 g, 1.12 mol), hydrated monobutyltin oxide (M&T Chemicals, 0.45 g, 0.2% of total reaction weight), sodium acetate (MCB, 0.11 g, 2 mol % of dimethyl 5-sulfoisophthalate, sodium salt), sodium cumenesulfonate (Ruetgers-Nease, 3.9 g, 4% of final oligomer weight), sodium xylenesulfonate (Ruetgers-Nease, 3.9 g, 4% of final oligomer weight), sodium toluenesulfonate (Ruetgers-Nease, 3.9 g 4% of final oligomer weight). This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 0.5 mm Hg and maintained there for 3 hours. The reaction flask is then allowed to air cool quite rapidly to near room temperature under-vacuum (approximately 30 minutes). The reaction affords 98.5 g of the desired oligomer as a tan solid.

The solubility is tested by weighing small amounts of material into 2 vials, adding enough distilled water to make 5% and 10%, by weight solutions, and agitating the vials vigorously. The material is readily soluble under these conditions. The ester has the empirical formula

(CAP)$_2$(EG/PG)$_4$(T)$_4$(SIP)$_1$.

EXAMPLE V

An ester composition made from sodium 2-(2-hydroxyethoxy)-ethanesulfonate, dimethyl terephthalate, dimethyl 5-sulfoisophthalate, sodium salt, ethylene glycol and propylene glycol. The example illustrates a generally useful synthesis of preferred doubly end-capped esters of the invention with the integration of 12% by weight of linear sodium dodecylbenzenesulfonate as a stabilizer.

To a 250 ml, three neck, round bottom flask equipped with a magentic stirring bar, modified Claisen head, condenser (set for distillation), thermometer, and temperature controller (Therm-O-Watch TM, I$^2$R) is added sodium 2-(2-hydroxyethoxy)ethanesulfonate (18.4 g, 0.096 mol)(prepared as in Example I), dimethyl terephthalate (Aldrich, 46.5 g, 0.240 mol), dimethyl 5-sulfoisophthalate, sodium salt (Aldrich, 14.2 g, 0.048 mol), ethylene glycol (Baker, 89.2 g, 1.44 mol), propylene glycol (Baker, 109.4 g, 1.44 mol), hydrated monobutyltin oxide (M&T Chemicals, 0.47 g, 2% of total reaction weight), sodium acetate (MCB, 0.89 g, 2 mol % of dimethyl 5-sulfoisophthalate, sodium salt), Siponate LDS-10 TM (Alcolac, linear sodium dodecylbenzenesulfonate, 10.0 g, vacuum dried, 12% of final oligomer weight), and silicone oil {Dow-710 TM, 0.08 g, 0.1% of final oligomer weight). This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 0.5 mm Hg and maintained there for 5 hours. The reaction flask is then allowed to air cool quite rapidly to near room temperature under .vacuum (approximately 30 minutes). The reaction affords 56 g of the desired oligomer as an opaque, green solid.

The solubility is tested by weighing small amounts of material into 2 vials, adding enough distilled water to make a 5% and 10% by weight solutions, and agitating the vials vigorously. The material is readily soluble under these conditions.

As in Example IV, the composition is novel in that the doubly end-capped oligomers present are homogenously mixed with stabilizers. The ratio of ethylene glycol to propylene glycol incorporated in the oligomer is 2.1:1. The ester has the empirical formula (CAP)$_2$(EG/PG)$_5$(T)$_5$(SIP)$_1$.

EXAMPLE VI

An ester composition made from sodium 2-(2-hydroxyethoxy)ethanesulfonate, dimethyl terephthalate, dimethyl 5-sulfoiso-phthalate, sodium salt, ethylene glycol and propylene glycol. The example illustrates a generally useful synthesis of preferred doubly end-capped esters of the invention with the integration of 12% by weight of a mixture of sulfonate hydrotropes as a stabillizer.

To a 250 ml, three neck, round bottom flask equipped with a magnetic stirring bar, modified Claisen head, condenser (set for distillation), thermometer, and temperature controller (Therm-O-Watch TM, I$^2$R) is added sodium 2-(2-hydroxyethoxy)ethanesulfonate (25.0 g, 0.130 mol)(prepared as in Example I), dimethyl terephthalate (Aldrich, 75.7 g, 0.390 mol), dimethyl 5-sulfoisophthalate, sodium salt (Aldrich, 19.3 g, 0.065 mol), ethylene glycol (Baker, 36.0 g, 0.580 mol), propylene glycol (Baker, 88.0 g, 1.16 mol), hydrated monobutyltin oxide (M&T Chemicals, 0.49 g, 0.2% of total reaction weight), sodium acetate (MCB, 0.11 g, 2 mol % of dimethyl 5-sulfoisophthalate, sodium salt), sodium cumenesulfonate (Ruetgers-Nease, 5.0 g, 4% of final oligomer wt.), sodium xylenesulfonate (Ruetgers-Nease, 5.0 g, 4% of final oligomer wt.), and sodium p-toluenesulfonate (Ruetgers-Nease, 5.0 g, 4% of final oligomer wt.). This mixture is heated to 180° C. and maintained at that temperature over night under argon as methanol and water distill from the reaction vessel. The material is transferred to a 1000 ml, single neck, round bottom flask and heated gradually over about 20 minutes to 240° C. in a Kugelrohr apparatus (Aldrich) at about 0.5 mm Hg and maintained there for 3 hours. The reaction flask is then allowed to air cool quite rapidly to near room temperature under vacuum (~30 min.). The reaction affords 122 g of the desired oligomer as a light brown solid. A $^{13}$C-NMR(DMSO-d$_6$) shows a resonance for —C(O)OCH$_2$CH$_2$O(O)C— at ~63.2 ppm (diester). A resonance for —C(O)OCH$_2$CH$_2$OH at ~59.4 ppm (residual monoester) is not detectable and is at least 30 times smaller than the diester peak. A resonance at ~51.0 ppm representing the sulfoethoxy capping group (—CH$_2$SO$_3$Na) is also present. A $^1$H-NMR(DMSO-d$_6$) shows a resonance at ~8.4 ppm representing the sulfoisophthalate aromatic hydrogens and resonance at ~7.9 ppm representing terephthalate aromatic hydrogens. The ratio of the peak for the methylene groups of diesters of ethylene glycol at ~4.7 ppm to the area of the peak for the methyne proton of diesters of propylene glycol at ~5.4 ppm is measured. From this, the molar ratio of incorporated ethylene/propylene glycols (E/P ratio) is calculated to be 0.8:1.

The solubility is tested by weighing small amounts of material into 2 vials, adding enough distilled water at room temperature to make 5% and 10% by weight solutions, and agitating the vials vigorously. The ester has the empirical formula (CAP)$_2$(EG/PG)$_6$ (T)$_6$(SIP)$_1$.

EXAMPLE VII

An ester composition made from sodium 2-(2-hydroxyethoxy)-ethanesulfonate, dimethyl terephthalate, dimethyl 5-sulfoisophthalate, and ethylene glycol. The example illustrates a generally useful synthesis of preferred doubly end-capped esters of the invention with the integration of 6% by weight of linear sodium dodecylbenzenesulfonate as a stabilizer.

To a 100 ml, three neck, round bottom flask equipped with a magnetic stirring bar, modified Claisen head, condenser (set for distillation), thermometer, and temperature controller (Therm-O-Watch, I$^2$R) is added sodium 2-(2-hydroxyethoxy)ethane sulfonate 10.0 g, 0.052 mol)(prepared as in Example I), dimethyl terephthalate (Aldrich, 30.2 g, 0.156 mol), dimethyl 5-sulfoisophthalate, sodium salt (Aldrich, 9.2 g, 0.031 mol), ethylene glycol (Baker, 46.0 g, 0.741 mol), hydrated monobutyltin oxide (M&T Chemicals, 0.20 g, 0.2% of total reaction weight), sodium acetate (MCB, 0.04 g, 2 mol % of dimethyl 5-sulfoisophthalate, sodium salt), and sodium dodecylbenzenesulfonate (Alcolac, Siponate ® LDS-10 3.0 g, 6% based on final oligomer weight). This mixture is heated to 180° C. and maintained at that temperature overnight under argon as methanol and water distill from the reaction vessel. A $^{13}$C-NMR(DMSO-d$_6$) shows this stage of the reaction to be complete by the disappearance of the resonance for methyl esters at ~52 ppm. The material is transferred to a 500 ml, single neck, round bottom flask and heated gradually over about 20 minutes to 240° C. in a Kugelrohr apparatus (Aldrich) at about 1 mm Hg and maintained there for 1 hour. The reaction flask is then allowed to air cool quite rapidly to near room temperature under vacuum (~30 min.). A $^{13}$C-NMR(DMSO-d$_6$) shows that the reaction is complete by the disappearance of the resonance at ~59 ppm corresponding to intermediate monoesters of ethylene glycol and the presence of a sizable resonance at ~63 ppm assigned to the diesters of ethylene glycol. Resonances associated with the sulfoethoxy capping groups are also present. The reaction affords 45.4 g of the desired oligomer as a glassy, brown solid.

The solubility is tested by weighing a small amount of material into a vial, crushing it, adding enough distilled water to make a 5% by weight solution, and agitating the vial vigorously. The material completely dissolves under these conditions. The ester has the empirical formula (CAP)$_2$(EG/PG)$_6$(T)$_6$(SIP)$_1$.

EXAMPLE VIII

An ester composition made from sodium 2-(2-hydroxyethoxy)ethanesulfonate, dimethyl terephthalate, dimethyl 5-sulfoisophthalate, sodium salt, ethylene glycol, and propylene glycol. The example illustrates a synthesis of doubly end-capped esters of the invention without the integration of stabilizers.

To a 250 ml, three neck round bottom flask equipped with a magnetic stirring bar, modified Claisen head, condenser (set for distillation), thermometer, and temperature controller (Therm-O-Watch TM, I$^2$R) is added sodium 2-(2-hydroxyethoxy)ethanesulfonate (18.4 g, 0.096 mol)(prepared as in Example I), dimethyl terephthalate (Aldrich, 46.5 g, 0.240 mol), dimethyl 5-sulfoisophthalate, sodium salt (Aldrich, 14.2 g, 0.048 mol), ethylene glycol (Baker, 44.6 g, 0.719 mol), propylene glycol (Baker, 109.4 g, 1.44 mol), hydrated monobutyltin oxide (M&T Chemicals, 0.247 g, 0.2% of total reaction weight), and sodium acetate (MCB, 0.08 g, 2 mol % of dimethyl 5-sulfoisophthalate, sodium salt). This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 0.5 mm Hg and maintained there for 4.5 hours. The reaction flask is then allowed to air cool quite rapidly to near room temperature under vacuum (~30 min.). The reaction affords 79 g of the desired oligomer as an opaque, green solid. A $^{13}$C-NMR(DMSO-d$_6$) shows a resonance for —C(O)OCH$_2$CH$_2$O(O)C— at ~63.2 ppm (diester) and a small resonance for —C(O)OCH$_2$CH$_2$OH at ~59.4 ppm (monoester). The ratio of the height of the diester peak to the height of the monoester peak is calculated to be 12. A resonance at ~51.0 ppm representing the sulfoethoxy capping group (—CH$_2$SO$_3$Na) is also present. A $^1$H-NMR(DMSO-d$_6$) shows a resonance at ~8.4 ppm representing the sulfoisophthalate aromatic hydrogens and a resonance at ~7.9 ppm representing terephthalate aromatic hydrogens. The ratio of the peak for the methylene groups of diesters of ethylene glycol at ~4.7 ppm to the area of the peak for the methyne proton of diesters of propylene glycol at ~5.4 ppm is measured. From this, the molar ratio of incorporated ethylene/propylene glycols (E/P ratio) is calculated to be 0.9:1.

The solubility is tested by weighing small amounts of material into 2 vials, adding enough distilled water to make 5% and 10% by weight solutions, and agitating the vials vigorously. The material is poorly soluble under these conditions. The ester has the empirical formula (CAP)$_2$(EG/PG)$_5$(T)$_5$(SIP)$_1$.

EXAMPLE IX

An ester composition made from sodium 2-(2-hydroxyethoxy)ethanesulfonate, dimethyl terephthalate, dimethyl 5-sulfoisophthalate, and ethylene glycol. The example illustrates a synthesis of doubly end-capped esters of the invention without the integration of a stabilizer.

To a 100 ml, three neck round bottom flask equipped with a magnetic stirring bar, modified Claisen head, condenser (set for distillation), thermometer, and temperature controller (Therm-O-Watch TM, I²R) is added sodium 2-(2-hydroxyethoxy)ethane sulfonate (10.0 g, 0.052 mol)(prepared as in Example I), dimethyl terephthalate (Aldrich, 30.2 g, 0.156 mol), dimethyl 5-sulfoisophthalate, sodium salt (Aldrich, 9.2 g, 0.031 mol), ethylene glycol (Baker, 46.0 g, 0.741 mol), hydrated monobutyltin oxide (M&T Chemicals, 0.2.% of total reaction weight), and sodium acetate (MCB, 0.04 g, 2 mol % of dimethyl 5-sulfoisophthalate, sodium salt). This mixture is heated to 180° C. and maintained at that temperature overnight under argon as methanol and water distill from the reaction vessel. A $^{13}$C-NMR(DMSO-d$_6$) shows this stage of the reaction to be complete by the disappearance of the resonance for methyl esters at ~52 ppm. The material is transferred to a 500 ml, single neck, round bottom flask and heated gradually, over about 20 minutes to 240° C. in a Kugelrohr apparatus (Aldrich) at about 0.5 mm Hg and maintained there 1 hour. The reaction flask is then allowed to air cool quite rapidly to near room temperature under vacuum (~30 min.). A $^{13}$C-NMR(DMSO-d$_6$) shows that the reaction is complete by the disappearance of the resonance at ~59 ppm corresponding to intermediate monoesters of ethylene glycol and the presence of a sizable resonance at ~63 ppm assigned to the diesters of ethylene glycol. Resonances associated with the sulfoethoxy capping groups are also present. The reaction affords 36.1 g of the desired oligomer as a glassy, brown solid.

The solubility is tested by weighing a small amount of material into a vial, crushing it, adding enough distilled water to make a 5% by weight solution, and agitating the vial vigorously. The ester is only partly soluble under these conditions. The ester has the empirical formula

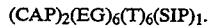

$(CAP)_2(EG)_6(T)_6(SIP)_1$.

EXAMPLE X

An ester composition made from sodium alpha-3-sulfopropyl-omega-hydroxy-poly(oxy-1,2-ethanediyl), dimethyl terephthalate, dimetheyl 5-sulfoisophthalate, ethylene glycol, and propelene glycol. This example illustrates a useful synthesis of preferred doubly end-capped esters of the invention with the integration of 6% LAS stabilizer.

To a 500 ml, three neck round bottom flask equipped with a magnetic stirring bar, modified Claisen head, condenser (set for distillation), thermometer, and temperature controller (Therm-O-Watch TM, I²R) is added sodium alpha-3-sulfopropyl-omega-hydroxy-poly(oxy-1,2-ethanediyl) (39.4 g, 0.156 mol, prepared as in Example III), dimethyl terephthalate (75.7 g, 0.390 mol), dimethyl 5-sulfoisophthalate, sodium salt (Aldrich, 23.1 g, 0.078 mol), ethylene glycol (Baker, 83.0 g, 1.34 mol), propylene glycol (Fisher, 90.3 g, 1.19 mol), Titanium (IV) Butoxide (Alfa Products, 0.06 g, 0.02% of total reaction weight), sodium acetate (Baker, 0.13 g, 2 mol % of dimethyl 5-sulfoisophthalate, sodium salt), Siponate® LDS-10 (linear sodium dodecylbenzenesulfonate, Alcolac, 8.3 g, vacuum dried, 6% of final polymer weight), and silicon oil (Dow-710, 0.08 g, 0.1% of final polymer weight}. This mixture is heated to 180° C. and maintained at that temperature overnight under argon as methanol distills from the reaction vessel. The material is transferred to a 1000 ml, single neck, round bottom flask and heated gradually over about 20 minutes to 240° C. in a Kugelrohr apparatus (Aldrich) at about 1.5 mm Hg and maintained there for 3 hours. The reaction flask is then allowed to air cool quite rapidly to near room temperature under vacuum (~30 min.). The reaction affords 123.6 g of the desired oligomer as a brown glass. A $^{13}$C-NMR(DMSO-d$_6$) shows a resonance for —C(O)OCH$_2$CH$_2$O(O)C— at ~63.2 ppm (diester). A resonance for —C(O)OCH$_2$CH$_2$OH at ~59.4 ppm (monoester) is not detectable and is at least 35 times smaller than the diester peak. A resonance at ~48.2 ppm representing the capping group (—CH$_2$SO$_3$Na) is also present. A $^1$H-NMR(DMSO-d$_6$) shows a resonance at ~8.4 ppm representing the sulfoisophthalate aromatic hydrogens and a resonance at ~7.9 ppm representing terephthalate aromatic hydrogens. The ratio of the peak area for the methylene groups of diesters of ethylene glycol at ~4.7 ppm to the area of the peak for the methyne proton of diesters of propylene glycol at ~5.4 ppm is measured. From this the molar ratio of incorporated ethylene/propylene glycols (E/P ratio) is calculated to be 2.1:1.

The solubility is tested by weighing small amounts of material into 2 vials, crushing it, adding enough distilled water to make 5% and 10% by weight solutions, and agitating the vials vigorously. The material is readily soluble under these conditions. The ester has the empirical formula

$(CAP_2(EG/PG)_5(T)_5(SIP)_1$.

EXAMPLE XI

An ester composition made from isethionic acid, sodium salt, sodium 2-(2-hydroxyethoxy)ethanesulfonate, dimethyl terephthalate, dimethyl 5-sulfoisophthalate, and ethylene glycol. This example illustrates a useful synthesis of preferred doubly end-capped esters with a mixture of-isethionate and 2-(2-hydroxyethoxy)ethanesulfonate end-caps and with the integration of 12% mixed hydrotropes as stabilizer.

To a 250 ml, three neck round bottom flask equipped with a magnetic stirring bar, modified Claisen head, condenser (set for distillation), thermometer, and temperature controller (Therm-O-Watch TM, I²R) is added isethionic acid, sodium salt (Aldrich, 4.7 g, 0.032 mol), sodium 2-(2-hydroxyethoxy)ethanesulfonate (6.1 g, 0.032 mol, prepared as in Example I), dimethyl terephthalate (27.6 g, 0.142 mol), dimethyl 5-sulfoisophthalate, sodium salt (Aldrich, 9.4 g, 0.032 mol), ethylene glycol (Baker, 55.9 g, 0.900 mol), hydrated monobutyltin oxide (M&T Chemicals, 0.21g, 0.2% of total reaction weight), sodium acetate (MCB, 0.05 g, 2 mol % of dimethyl 5-sulfoisophthalate, sodium salt), and sodium dodecylbenzenesulfonate (Siponate LDS-10® Alcolac, vacuum dried, 3.0 g, 6% of polymer wt.). This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 0.5 mm Hg and maintained there for 1 hour. Foaming which occurs during the Kugelrohr process results in the loss of some material. The reaction flask is then allowed to air cool quite rapidly to near room temperature under vacuum (~30 min.). The reaction affords 10.4 g of the desired oligomer as a tan, opaque solid. A $^{13}$C-NMR(DMSO-d$_6$) shows a resonance for —C(O)OCH$_2$CH$_2$O(O)C— at ~63.2 ppm (diester). A resonance for —C(O)OCHhd 2CH$_2$OH at ~59.4 ppm (monoester) is also detectable. The ratio of the heights of the diester peak to monoester peak is measured to be 12.8. Resonances at ~49.8 ppm and ~51.0 ppm representing the two sulfoethoxy capping groups (—CH$_2$SO$_3$Na) are also present. A $^1$H-NNR (DNSO-d$_6$) shows a resonance at ~8.4 ppm representing the sulfoisophthalate aromatic hydrogens, and a resonance at ~7.9 ppm representing terephthalate aromatic hydrogens.

The solubility is tested by weighing small amounts of material into 2 vials, crushing it, adding enough distilled water to make 5% and 10% by weight solutions, and agitating the vials vigorously. The majority of the sample is soluble under these conditions. The ester has the empirical formula

(CAP)$_2$(EG/PG)$_{4.5}$(T)$_{4.5}$(SIP)$_1$.

EXAMPLE XII

An ester composition made from sodium 2-(2-hydroxyethoxy)ethanesulfonate, dimethyl terephthalate, dimethyl 5-sulfoisophthalate, ethylene glycol, diethylene glycol, and propylene glycol. This example illustrates a useful synthesis of preferred doubler end-capped esters with a long chain backbone and with the integration of 12% mixed hydrotropes as stabilizer.

To a 250 ml, three neck round bottom flask equipped with a magnetic stirring bar, modified Claisen head, condenser (set for distillation), thermometer, and temperature controller (Therm-O-Watch TM, I$^2$R) is added sodium 2-(2-hydroxyethoxy)ethanesulfonate (10.0 g, 0.052 mol, prepared as in Example I), dimethyl terephthalate (Aldrich, 55.5 g, 0.286 mol), dimethyl 5-sulfoisophthalate, sodium salt (Aldrich, 15.4 g, 0.052 mol), ethylene glycol (Baker, 24.2 g, 0.390 mol), propylene glycol (Baker, 28.7 g, 0.377 mol), hydrated monobutyltin oxide (M&T Chemicals, 0.17 g, 0.2% of total reaction weight), sodium acetate (NCB, 0.09 g, 2 mol % of dimethyl 5-sulfoisophthalate, sodium salt), sodium cumenesulfonate (Ruetgers-Nease, 3.3 g, 4% of final polymer wt.), sodium xylenesulfonate (Ruetgers-Nease, 3.3 g, 4% of final polymer wt.), and sodium p-tol-uenesulfonate (Ruetgers-Nease, 3.3 g, 4% of final polymer wt.). This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 2 mm Hg and maintained there for 3 hours. The reaction flask is then allowed to air cool quite rapidly to near room temperature under vacuum (~30 min.). The reaction affords 49 g of the desired oligomer as a yellow, crunchy glass. A $^{13}$C-NHR(DMSO-d$_6$) shows a resonance for —C(O)OCH$_2$CH$_2$O(O)C— at 63.2 ppm (diester). A resonance for —C(O)O-CH$_2$OH at ~59.4 ppm (monoester) is not detectable and is at least 40 times smaller than the diester peak. A resonance at ~51.0 ppm representing the sulfoethoxy capping group —(CH$_2$SO$_3$Na) is also present. A $^1$H-NMR(DMSO-d$_6$) shows a resonance at ~8.4 ppm representing the sulfoisophthalate aromatic hydrogens and a resonance at ~7.9 ppm representing terephthalate aromatic hydrogens. The ratio of the peak for the methylene groups of diesters of ethylene glycol at ~4.7 ppm to the area of the peak for the methyne proton of diesters of propylene glycol at ~5.4 ppm is measured. From this, the molar ratio of incorporated ethylene/propylene glycols (E/P ratio) is calculated to be 1.75:1.

The solubility is tested by weighing small amounts of material into 2 vials, adding enough distilled water to make 5% and 10% by weight solutions, respectively, and agitating the vials vigorously. The material is only partly soluble under these conditions but enough dissolved such that the 10% "solution" gelled after standing for several days.

Repetition of this preparation with the addition of 0.0624 moles of diethylene glycol to the initial reaction mixture gives a similar polymer which by analysis has 5.2 wt % diethylene glycol incorporated in its structure and which dissolves noticeably more easily in water. The ester has the empirical formula:

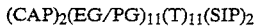

(CAP)$_2$(EG/PG)$_{11}$(T)$_{11}$(SIP)$_2$

Use of Esters of the Invention as Soil-Release Agents—Esters of the invention are especially useful as soil release agents of a type compatible in the laundry with conventional detersive ingredients such as those found in granular laundry detergents. Additionally, the esters are useful in laundry additive or pretreatment compositions comprising the essential ester compositions and optional fabric cleaning ingredients. The ester compositions, as provided herein, will typically constitute at least about 0.1%, preferably from about 0.1% to about 10%, most preferably from about 0.2% to about 3.0% by weight of a detergent composition.

Detersive Surfactant—The amount of detersive surfactant included in the fully-formulated detergent compositions afforded by the present invention can vary from about 1% to about 99.8% by weight of detergent composition depending upon the particular surfactants used and the effects desired. Preferably, the detersive surfactants comprise from about 5% to about 80% by weight of the composition.

The detersive surfactant can be nonionic, anionic, ampholytic, zwitterionic, or cationic. Mixtures of these surfactants can also be used. Preferred detergent compositions comprise anionic detersive surfactants or mixtures of anionic surfactants with other surfactants, especially nonionic surfactants.

Nonlimiting examples of surfactants useful herein include the conventional C$_{11}$-C$_{18}$ alkyl benzene sulfonates and primary, secondary and random alkyl sulfates, the C$_{10}$-C$_{18}$ alkyl alkoxy sulfates, the C$_{10}$-C$_{18}$ alkyl polyglycosides and their corresponding sulfated polyglycosides, C$_{12}$-C$_{18}$ alpha-sulfonated fatty acid esters, C$_{12}$-C$_{18}$ alkyl and alkyl phenol alkoxylates (especially ethoxylates and mixed ethoxy/propoxy), C$_{12}$-C$_{18}$ betaines and sulfobetaines ("sultaines"), C$_{10}$-C$_{18}$ amine oxides, and the like. Other conventional useful surfactants are listed in standard texts.

One class of nonionic surfactant particularly useful in detergent compositions of the present invention is condensates of ethylene oxide with a hydrophobic moiety to provide a surfactant having an average hydrophilic-lipophilic balance (HLB) in the range of from 5 to 17, preferably from 6 to 14, more preferably from 7 to 12. The hydrophobic (lipophilic) moiety may be aliphatic or aromatic in nature. The length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$-$C_{15}$ primary alcohol ethoxylates containing 3-8 moles of ethylene oxide per mole of alcohol, particularly the $C_{14}$-$C_{15}$ primary alcohols containing 6-8 moles of ethylene oxide per mole of alcohol, the $C_{12}$-$C_{15}$ primary alcohols containing 3-5 moles of ethylene oxide per mole of alcohol, and mixtures thereof.

Another suitable class of nonionic surfactants comprises the polyhydroxy fatty acid amides of the formula:

  (I)

wherein: $R^1$ is H, $C_1$-$C_8$ hydrocarbyl, 2-hydroxyethyl, 2-hydroxypropyl, or a mixture thereof, preferably $C_1$-$C_4$ alkyl, more preferably $C_1$ or $C_2$ alkyl, most preferably $C_1$ alkyl (i.e., methyl); and $R^2$ is a $C_5$-$C_{32}$ hydrocarbyl moiety, preferably straight chain $C_7$-$C_{19}$ alkyl or alkenyl, more preferably straight chain $C_9$-$C_{17}$ alkyl or alkenyl, most preferably straight chain $C_{11}$-$C_{19}$ alkyl or alkenyl, or mixture thereof; and Z is a polyhydroxyhydrocarbyl moiety having a linear hydrocarbyl chain with at least 2 (in the case of glyceraldehyde) or at least 3 hydroxyls (in the case of other reducing sugars) directly connected to the chain, or an alkoxylated derivative (preferably ethoxylated or propoxylated) thereof. Z preferably will be derived from a reducing sugar in a reductive amination reaction; more preferably Z is a glycityl moiety. Suitable reducing sugars include glucose, fructose, maltose, lactose, galactose, mannose, and xylose, as well as glyceraldehyde. As raw materials, high dextrose corn syrup, high fructose corn syrup, and high maltose corn syrup can be utilized as well as the individual sugars listed above. These corn syrups may yield a mix of sugar components for Z. It should be understood that it is by no means intended to exclude other suitable raw materials. Z preferably will be selected from the group consisting of —$CH_2$-$(CHOH)_n$-$CH_2OH$, —CH($CH_2OH$)-$(CHOH)_{n-1}$-$CH_2OH$, —$CH_2$-$(CHOH)_2(CHOR')(CHOH)$-$CH_2OH$, where n is an integer from 1 to 5, inclusive, and R' is H or a cyclic mono- or poly- saccharide, and alkoxylated derivatives thereof. Most preferred are glycityls wherein n is 4, particularly -$CH2$-$(CHOH)_4$-$CH_2OH$.

In Formula (I), $R^1$ can be, for example, N-methyl, N-ethyl, N-propyl, N-isopropyl, N-butyl, N-isobutyl, N-2-hydroxy ethyl, or N-2-hydroxy propyl. For highest sudsing, $R^1$ is preferably methyl or hydroxyalkyl. If lower sudsing is desired, $R^1$ is preferably $C_2$-$C_8$ alkyl, especially n-propyl, iso-propyl, n-butyl, iso-butyl, pentyl, hexyl and 2-ethyl hexyl.

$R^2$-CO-N< can be, for example, cocamide, stearamide, oleamide, lauramide, myristamide, capricamide, palmitamide, tallowamide, etc.

Detersive Builders—Optional detergent ingredients employed in the present invention contain inorganic and/or organic detersive builders to assist in mineral hardness control. If used, these builders comprise from about 5% to about 80% by weight of the detergent compositions.

Inorganic detersive builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales.

Examples of silicate-builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck, available from Hoechst under the trademark "SKS"; SKS-6 is an especially preferred layered silicate builder.

Aluminosilicate builders are especially useful in the present invention. Preferred aluminosilicates are zeolite builders which have the formula:

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. Methods for producing aluminosilicate ion exchange materials are disclosed in U.S. Pat. NO. 3,985,669, Krummel, et al, issued Oct. 12, 1976, and U.S. Pat. No. 4,605,509, Corkill, et al, issued Aug. 12, 1986. Preferred synthetic crystalline aluminosilicate ion exchange materials useful herein are available under the designations Zeolite A, Zeolite P (B), (including those disclosed in EPO 384,070), and Zeolite X. Preferably, the aluminosilicate has a particle size of about 0.1-10 microns in diameter.

Organic detersive builders suitable for the purposes of the present invention include, but are not restricted to, a wide variety of polycarboxylate compounds, such as ether polycarboxylates, including oxydisuccinate, as disclosed in Berg, U.S. Pat. No. 3,128,287, issued Apr. 7, 1964, and Lambertl et al, U.S. Pat. No. 3,635,830, issued Jan. 18, 1972. See also "TMS/TDS" builders of U.S. Pat. No. 4,663,071, issued to Bush et al, on May 5, 1987.

Other useful detersive builders include the ether hydroxypolycarboxylates, copolymers of maleic anhydride with ethylene or vinyl methyl ether, 1, 3, 5-trihydroxy benzene-2, 4, 6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such-as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are preferred polycarboxylate builders that can also be used in granular compositions, especially in combination with zeolite and/or layered siltcate builders.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-disphosphonate and other known phosphonates (see, for example, U.S. Pat. Nos. 3,159,581; 3,213,030; 3,422,021; 3,400,148 and 3,422,137) can also be used.

Optional Detersive Adjuncts—As a preferred embodiment, the conventional detergent ingredients employed herein can be selected from typical detergent composition components such as detersive surfactants and detersive builders. Optionally, the detergent ingredients can include one or more other detersive adjuncts or other materials for assisting or enhancing cleaning performance, treatment of the substrate to be cleaned, or to modify the aesthetics of the detergent composition. Usual detersive adjuncts of detergent compositions include the ingredients set forth in U.S. Pat. No. 3,936,537, Baskerville et al. Adjuncts which can also be included in detergent compositions employed in the present invention, in their conventional art-established levels for use (generally from 0% to about 20% of the detergent ingredients, preferably from about 0.5% to about 10%), include enzymes, especially proteases, lipases, and cellulases, color speckles, suds boosters, suds suppressors, antitarnish and/or anticorrosion agents, soil-suspending agents, dyes, fillers, optical brighteners, germicides, alkalinity sources, antioxidants, enzyme stabilizing agents, perfumes, solvents, solubilizing agents, clay soil removal/anti-redeposition agents, polymeric dispersing agents, processing aids, dye transfer inhibiting agents, including polyamine N-oxides such as polyvinylpyrrolidone and copolymers of N-vinyl imidazole and N-vinyl pyrrolidone, fabric softening components, static control agents, etc.

Bleaching Agents—Optionally, the detergent compositions employed herein can comprise one or more conventional bleaching agents, activators, or stabilizers, especially peroxyacids, which do not react with the soil release compositions of this invention. In general, the formulator will ensure that the bleach compounds used are compatible with the detergent formulation. Conventional tests, such as tests of bleach activity on storage in the presence of the separate or fully-formulated ingredients, can be used for this purpose.

The peroxyacid can be a preformed peroxyacid, or a combination of an inorganic persalt (e.g., sodium perborate or sodium percarbonate), and an organic peroxyacid precursor which is converted to a peroxyacid when the combination of persalt and precursor is dissolved in water. The organic peroxyacid precursors are often referred to in the art as bleach activators.

Examples of suitable organic peroxyacids are disclosed in U.S. Pat. No. 4,374,035, Bossu, issued Feb. 15, 1983; U.S. Patent No. 4,681,592, Hardy et al, issued Jul. 21, 1987; U.S. Patent No. 4,634,551, Burns et al, issued Jan. 6, 1987; U.S. Patent No. 4,686,063, Burns, issued Aug. 11, 1987; U.S. Patent No. 4,606,838, Burns, issued Aug. 19, 1986; and U.S. No. 4,671,891, Hartman, issued Jun. 9, 1987. Examples of compositions suitable for laundry bleaching which contain perborate bleaches and activators therefor are disclosed in U.S. Patent No. 4,412,934, Chung and Spadini, issued Nov. 1983; U.S. Patent No. 4,536,314, Hardy et al, issued Aug. 20, 1985; U.S. Patent No. 4,681,695, Divo, issued Jul. 21, 1987; and U.S. Patent No. 4,539,130, Thompson et al, issued Sep. 3, 1985.

Specific examples of preferred peroxyacids which can be incorporated in this invention include diperoxydodecanedioic acid (DPDA), nonylamide of peroxysuccinic acid (NAPSA), nonylamide of peroxyadipic acid (NAPAA) and decyldiperoxysuccinic acid (DDPSA). The peroxyacid is preferably incorporated into a soluble granule according to the method described in the above cited U.S. Pat. No. 4,374,035. A preferred bleach granule comprises, by weight, 1% to 50% of an exotherm control agent (e.g., boric acid); 1% to 25% of a peroxyacid compatible surfactant (e.g., C13LAS); 0.1% to 10% of one or more chelant stabilizers (e.g., sodium pyrophosphates); and to 70% of a water-soluble processing salt (e.g., $Na_2SO_4$).

The peroxyacid bleach is used at a level which provides an amount of available oxygen (AvO) from about 0.1% to about 10%, preferably from about 0.5% to about 5%, and most preferably from about 1% to about 4%, all by weight of the composition.

Effective amounts of peroxyacid bleach per unit dose of the composition of this invention used in typical laundry liquor, e.g., containing 65 liters of 16°-60° C. water, provide from about 1 ppm to about 150 ppm of available oxygen (AvO), more preferably from about 2 ppm to about 20 ppm. The laundry liquor should also have a pH of from about 7 to about 11, preferably from about 7.5 to about 10.5, for effective peroxyacid bleaching. See Col. 6, lines 1–10, of U.S. Pat. No. 4,374,035.

Alternatively, the composition may contain a suitable organic precursor which generates one of the above peroxyacids when reacted with alkaline hydrogen peroxide in aqueous solution. The source of hydrogen peroxide can be any inorganic peroxygen compound which dissolves in aqueous solution to generate hydrogen peroxide, e.g., sodium perborate (monohydrate and tetrahydrate) and sodium percarbonate.

The level of peroxygen bleach within compositions of the invention is from about 0.1% to about 95% and preferably from about 1% to about 60%. When the bleaching compositions within the invention are also fully formulated detergent compositions, it is preferred that the level of peroxygen bleach is from about 1% to about 20%.

The level of bleach activator within the compositions of the invention is from about 0,1% to about 60% and preferably from about 0.5% to about 40%. When the bleaching compositions within the invention are also fully formulated detergent compositions, preferred that the level of bleach activator is from about 0,5% to about 20%.

The peroxyacid and the soil release esters herein are preferably present at a weight ratio of available oxygen provided by the peroxyacid to soil release esters of from about 4:1 to about 1:30, more preferably from about 2:1 to about 1:15, and most preferably from about 1:1 to about 1:7.5. The combination can be incorporated into a fully formulated, stand alone product, or it can be formulated as an additive to be used in combination with a laundry detergent.

Cellulase Enzyme—Optionally, the detergent compositions employed herein can comprise one or more conventional enzymes that do not react with the soil release compositions of this invention. A particularly preferred enzyme is cellulase. The cellulase employed herein may be any bacterical or fungal cellulase, having a pH optimum of between 5 and 9.5. Suitable cellulases are disclosed in U.S. Pat. No. 4,435,307, Barbesgoard et al, issued Mar. 6, 1984, which discloses fungal cellulase produced by a strain of Humicola insolens, particularly by the Humicola strain DSH 1800 or a cellulase 212-producing fungus belonging to the genus Aeromonas, and cellulase extracted from the hepatopancreas of a marine mullosk (Dolabella Auricula Solander). Suitable cellulases are also disclosed in GB-A-2,075,028, GB-A-2,095,275 and DE-OS-2,247,832.

Preferred cellulases are those as described in International Patent Application WO 91/17243. For example, a cellulase preparation useful in the compositions of the invention can consist essentially of a homogeneous endoglucanase component, which is immunoreactive with an antibody raised against a highly purified 43 kD cellulase derived from Humicola insolens, DSM 1800, or which is homologous to said 43 kD endoglucanase.

Enzymes are normally incorporated at a level sufficient to provide up to about 50 mg by weight, more typically about 0.01 mg to about 10 mg, of active enzyme per gram of detergent composition. Stated otherwise, an effective amount of the enzymes optionally employed in the present invention will comprise at least about 0.001%, preferably from about 0.001% to about 5%, more preferably from about 0.001% to about 1%, most preferably from about 0.01% to about 1%, by weight of detergent composition.

Ester compositions of the invention, at concentrations in an aqueous fabric laundering liquor ranging from about 1 to about 50 ppm, more preferably about 2.5 to about 30 ppm, provide effective, combined cleaning and soil release treatments for polyester, polyester-cotton blends and other synthetic fabrics washed in an aqueous, preferably alkaline (pH range about 7 to about 11, more preferably about 7.5 to about 10.5) environment, in the presence of typical granular detergent ingredients. Surprisingly (especially insofar as pH and anionic surfactant are concerned), all of the detergent ingredients listed above can be present in the wash water at their art disclosed levels to perform their conventional tasks, e.g., for cleaning and bleaching fabrics or the like, without ill-effects on the soil release properties of the esters.

Thus the invention encompasses a method of laundering fabrics and concurrently providing a soil release finish thereto. The method simply comprises contacting said fabrics with an aqueous laundry liquor containing the conventional detersive ingredients described hereinabove, as well as the above-disclosed effective levels of a soil release agent (namely, from about 1 to 50 ppm of an oligomeric composition comprising at least 10% by weight of an ester of the invention). Although this method is not especially limited in terms of factors such as pH and surfactant types present, it should be appreciated that for best cleaning of fabrics it is often especially desirable to make use in the laundry process of anionic surfactants, such as conventional linear alkylbenzene sulfonates and also to use higher pH ranges as defined above. Use of these surfactants and pH ranges surprisingly does not prevent the esters of the invention from acting effectively as soil release agents. Thus, a preferred method for an optimized combination of cleaning and soil-release finishing provided by the invention constitutes using all of the following:
 -the preferred levels of soil release agent (2.5–30 ppm);
 -anionic surfactant;
 -pH of from about 7 to about 11; and, by way of soil release agent, a preferred composition of the invention, such as the oligomeric product of reacting compounds comprising sulfonated end-caps, dimethyl terephthalate, dimethyl sulfoisophthalate, ethylene glycol, propylene glycol, and diethylene glycol.

In the preferred method, polyester, polyester-cotton blends and other synthetic fabrics are used; best soil release results are achieved thereon, but other fabric types can also be present.

The most highly preferred method for simultaneous cleaning and soil-release treatment is a "multi-cycle" method; although benefits are surprisingly obtainable after as little treatment as a single laundry/use cycle, best results are obtained using two or more cycles comprising the ordered sequence of steps:
 a) contacting said fabrics with said aqueous laundry liquor in a conventional automatic washing machine or by hand-wash for periods ranging from about 5 minutes to about 1 hour;
 b) rinsing said fabrics with water;
 c) line- or tumble-drying said fabrics; and
 d) exposing said fabrics to soiling through normal wear or domestic use.

Naturally, it will be appreciated that this "multi-cycle" method encompasses methods starting at any one of steps a) through d), provided that the soil release treatment step (a) is used two or more times. Optionally, a further "soaking" step may be included in the laundry/use cycle. Typically, users soak or pre-soak laundry for as little as five minutes to as long as overnight or longer by contacting said fabrics with said aqueous laundry liquor.

In the above, step (a) includes both hand-washing or U.S., Japanese, or European washing machines operating under their conventional conditions of time, temperature, fabric load, amounts of water and laundry product concentrations. Also, in step (c), the "tumble-drying" to which is referred especially involves use of conventional domestic brands of programmable laundry dryers (these are occasionally integral with the washing machine) using their conventional fabric loads, temperatures and operating times.

The following nonlimiting examples illustrate the use of a typical ester composition of the invention (that of Example V) as a soil release agent for thru-the-wash application to polyester fabrics.

EXAMPLES XIII–XVI

Granular detergent compositions are prepared comprising the following ingredients.

| Ingredient | Percent (Wt) | | | |
|---|---|---|---|---|
| | XIII | XIV | XV | XVI |
| Na $C_{11}$–$C_{13}$ alkylbenzenesulfonate | 13.3 | 13.7 | 10.4 | 11.1 |
| Na $C_{14}$–$C_{15}$ alcohol sulfate | 3.9 | 4.0 | 4.5 | 11.2 |
| Na $C_{14}$–$C_{15}$ alcohol ethoxylate (0.5) sulfate | 2.0 | 2.0 | 0.0 | 0.0 |
| Na $C_{12}$–$C_{13}$ alcohol ethoxylate (6.5) | 0.5 | 0.5 | 0.5 | 1.0 |
| tallow fatty acid | 0.0 | 0.0 | 0.0 | 1.1 |
| sodium tripolyphosphate | 0.0 | 41.0 | 0.0 | 0.0 |
| Zeolite A, hydrate (0.1–10 micron size) | 26.3 | 0.0 | 21.3 | 25.0 |
| sodium carbonate | 23.9 | 12.4 | 25.2 | 16.1 |
| sodium polyacrylate (45%) | 3.4 | 0.0 | 2.7 | 3.4 |
| sodium silicate (1:6 ratio $NaO/SiO_2$)(46%) | 2.4 | 6.4 | 2.1 | 2.6 |
| sodium sulfate | 10.5 | 10.9 | 8.2 | 5.0 |

-continued

| Ingredient | Percent (Wt) | | | |
|---|---|---|---|---|
| | XIII | XIV | XV | XVI |
| sodium perborate | 1.0 | 1.0 | 5.0 | 10.0 |
| poly(ethylene glycol), MW ~ 4000 (50%) | 1.7 | 0.4 | 1.0 | 1.1 |
| citric acid | 0.0 | 0.0 | 3.0 | 0.0 |
| nonyl ester of sodium p-hydroxybenzenesulfonate | 0.0 | 0.0 | 5.9 | 0.0 |
| Diperoxydodecanedioic acid | 0.0 | 0.0 | 0.0 | 6.0 |
| moisture | 8.5 | 5.1 | 8.1 | 5.3 |

Balance to 100% can, for example, include minors like optical brightener, perfume, suds suppressor, soil dispersant, protease, lipase, cellulase, chelating agents, dye transfer inhibiting agents, additional water, and fillers, including $CaCO_3$, talc, silicates, and clays.

Aqueous crutcher mixes of heat and alkali stable components of the detergent compositions are prepared and spray-dried and other ingredients are admixed so that they contain the ingredients tabulated at the levels shown. The ester composition of Example IV is pulverized and admixed in an amount sufficient for use at a level of 0,5% by weight in conjunction with the detergent compositions.

The detergent granules with soil release agents are added together with a 6 lb, load of previously laundered and soiled fabrics (load composition: 10 wt. % polyester fabrics/50 wt. % polyester-cotton blends/40 wt. % cotton fabrics) to a Sears KENMORE washing machine, Actual weights of detergent and ester compositions are taken to provide a 995 ppm concentration of the former and 5 ppm concentration of the latter in the 17 gallon (65 l) water-fill machine, The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.), The fabrics are then line dried and are exposed to a variety of soils (by wear or controlled application), The entire cycle of laundering and soiling is repeated several times for each of the detergent compositions. Separate fabric bundles are reserved for use with each of the detergent compositions, All polyester-containing fabrics display significantly improved removal of soils (especially oleophilic types) during laundering compared with fabrics which have not been exposed to the esters of the invention,

EXAMPLE XVII

Aqueous crutcher mixes of heat and alkali stable components of the detergent compositions are prepared according to the procedure followed in Examples XIII--XVI. The ester composition of Example V is pulverized and admixed in an amount sufficient for use at a level of 0.5% by weight in conjunction with the detergent composition of Example XVI.

The laundering method of Examples XIII-XVI is repeated. All polyester-containing fabrics display significantly improved removal of soils (especially oleophilic types) during laundering compared with fabrics which have not been exposed to the esters of the invention.

The soil release compositions of the invention are especially useful in conventional laundry detergent compositions such as those typically found in granular detergents or laundry bars. U.S. Pat. No. 3,178,370, Okenfuss, issued Apr. 13, 1965, describes laundry detergent bars and processes for making them. Philippine Patent 13,778, Anderson, issued Sep. 23, 1980, describes synthetic detergent laundry bars. Methods for making laundry detergent bars by various extrusion methods are well known in the art.

EXAMPLE XVIII

A laundry bar suitable for hand-washing soiled fabrics is prepared by standard extrusion processes and comprises the following.

| Component | Weight % |
|---|---|
| $C_{12}$ linear alkyl benzene sulfonate | 30 |
| Phosphate (as sodium tripolyphosphate) | 7 |
| Sodium carbonate | 25 |
| Sodium pyrophosphate | 7 |
| Coconut monoethanolamide | 2 |
| Zeolite A (0.1-10 micron) | 5 |
| Carboxymethylcellulose | 0.2 |
| Ethylenediamine disuccinate chelant (EDDS) | 0.4 |
| Polyacrylate (m.w. 1400) | 0.2 |
| Nonanoyloxybenzenesulfonate | 5 |
| Sodium percarbonate* | 5 |
| Brightener, perfume | 0.2 |
| Protease | 0.3 |
| $CaSO_4$ | 1 |
| $MgSO_4$ | 1 |
| Water | 4 |
| Filler** | Balance to 100% |

*Average particle size of 400 to 1200 microns.
**Can be selected from convenient materials such as $CaCO_3$, talc, clay, silicates, and the like.

The detergent laundry bars are processed in conventional soap or detergent bar making equipment as commonly used in the art. The soil release agent of Example VI is pulverized and admixed in an amount sufficient for use at a level of 0.5% by weight in conjunction with the detergent compositions. Testing is conducted following the testing method in Examples XIII-XVI except that the fabrics are washed by hand instead of with a Sears KENMORE washing machine. All polyester-containing fabrics display significantly improved removal of soils (especially oleophilic types) during laundering compared with fabrics which have not been exposed to the esters of the invention.

EXAMPLE XIX

Detergent laundry bars are processed in conventional soap or detergent bar making equipment. The soil release agent of Example VII is pulverized and admixed in an amount sufficient for use at a level of 0.5% by weight in conjunction with the detergent compositions of Example XVIII. Testing is conducted following the testing method in Example XVIII. All polyester-containing fabrics display significantly improved removal of soils (especially oleophilic types) during laundering compared with fabrics which have not been exposed to the esters of the invention.

What is claimed is:

1. A water-soluble or water-dispersible soil release agent comprising:
A) at least about 10% by weight of a substantially linear sulfonated poly-ethoxy/propoxy end-capped ester having molecular weight ranging from about 500 to about 8,000; said ester consisting essentially of on a molar basis:
  i) from about 1 to about 2 moles of sulfonated poly-ethoxy/propoxy end-capping units of the formula:

wherein M is a salt-forming cation such as sodium or tetraalkylammonium, m is 0 or 1, R is ethylene, propylene or a mixture thereof, and n is from 0 to 2; and mixtures thereof;
  ii) from about 0.5 to about 66 moles of units selected from the group consisting of:
    a) oxyethyleneoxy units;
    b) a mixture of oxyethyl eneoxy and oxy- 1,2-propleneoxy units wherein said oxyethyleneoxy units are present in an oxyethyleneoxy to oxy-1,2-propleneoxy mole ratio ranging from 0.5:1 to about 10:1; and
    c) a mixture of a) or b) with poly(oxyethylene)oxy units wherein said poly(oxyethylene)oxy units have a degree of polymerization of from 2 to 4; provided that when said poly(oxyethylene)oxy units have a degree of polymerization of 2, the mole ratio of poly(oxyethylene)oxy units to total group ii) units ranges from 0:1 to about 0.33:1; and when said poly(oxyethylene)oxy units have a degree of polymerization of 3, the mole ratio of poly(oxyethylene)oxy units to total group ii) units ranges from 0:1 to about 0.22:1; and when said poly(oxyethylene)oxy units have a degree of polymerization of 4, the mole ratio of poly(oxyethylene)oxy units to total group ii) units ranges from 0:1 to about 0.14:1;
  iii) from about 1.5 to about 40 moles of terephthaloyl units; and
  iv) from 0 to about 26 moles of 5-sulfoisophthaloyl units of the formula

—(O)C(C₆H₃)(SO₃M)C(O)— wherein H is a salt forming cation; and
  B) from about 0.5%. to about 20% by weight of ester of one or more crystallization-reducing stabilizers.

2. A soil release-agent according to claim 1, wherein the crystallization-reducing stabilizer is selected from the group consisting of:
  i) alkali metal and tetraalkylammonium salts of aromatic sulfonic acids or substituted aromatic sulfonic acids selected from the group consisting of:
    a) $(R_1)_n Ar-SO_3M$;
    b) $(R_2)Ar(SO_3M)-O-(R_2)Ar(SO_3M)$; and
    c) mixtures thereof, wherein Ar is an aromatic hydrocarbon group, each $R_1$ is a hydrogen radical or a $C_1-C_4$ alkyl group, each $R_2$ is a $C_1-C_{18}$ alkyl group, n is from 0 to 3, and M is an alkali metal or tetraalkylammonium ion;
  ii) alkali metal and tetraalkylammonium salts of linear or branched alkylbenzenesulfonates wherein the alkyl group is from about $C_5$ to about $C_{16}$, preferably from about $C_{11}$ to about $C_{13}$;
  iii) thermally-stable alkyl chain sulfonates wherein the alkyl chain contains from about 4 to about 20 carbon atoms; and
  iv) mixtures thereof.

3. The soil release agent of claim 1 wherein said ester consists essentially of said units i) and ii) and iii), and has a linear backbone formed from ester-bond-connected units ii) and iii).

4. The soil release agent of claim 3, wherein said ester is essentially in the doubly end-capped form.

5. The soil release agent of claim 3 which comprises from about 25% to about 100% by weight of ester having the empirical formula $(CAP)_x(EG/PG)_y(T)_z$;

wherein (CAP) represents the sodium salt form of said sulfonated end-capping units i); (EG/PG) represents said oxyethyl eneoxy, oxy-1,2-propyleneoxy and poly-(oxyethylene)oxy units ii); (T) represents said terephthaloyl units iii); x is from about-1 to 2; y is from about 0.5 to about 7; z is from about 1.5 to about 7; wherein x, y and z represent the average number of moles of the corresponding units per mole of said ester.

6. The soil release agent of claim 5, further characterized in that the oxyethyleneoxy:oxy-1,2-propyleneoxy mole ratio ranges from about 1:1 to about 10:1; x is about 2, y is from about 1 to about 6, and z is from about 2 to about 6.

7. The soil release agent of claim 6 which is comprised of at least 50% by weight of said ester having molecular weight ranging from about 500 to about 5,000 and of at least 3% of said crystallization-reducing stabilizer.

8. A water-soluble or dispersible soil release agent according to claim 5, derived by a process which comprises at least one step of reacting:
  A) dimethyl terephthalate;
  B) one or more glycol reactants selected from the group consisting of:
    a) ethylene glycol;
    b) a mixture of ethylene glycol and propylene glycol; and
    c) a mixture of a) or b) with diethylene glycol, triethylene glycol, tetraethylene glycol or a mixture thereof; and
  C) a compound selected from the group consisting of monovalent cation salts of said sulfonated polyethoxy/propoxy end-caps, in the presence of at least one conventional transestertification catalyst and one or more crystallization-reducing stabilizer.

9. The soil release agent of claim 8, wherein said glycol reactant is ethylene glycol.

10. The soil release agent of claim 1 wherein said ester consists essentially of said units i), ii), iii) and iv); said ester further being characterized in that it has a linear backbone formed from ester-bond connected units ii), iii) and iv).

11. The soil release agent of claim 10 which comprises from about 25% to about 100% by weight of ester having the empirical formula $(CAP)_x(EG/PG)_y(T)_z(SIP)_q$;

wherein (CAP) represents the sodium salt form of said sulfonated end-capping units i ); (EG/PG) represents said oxyethyleneoxy, oxy-1,2-propyleneoxy and poly-(oxyethylene)oxy units ii); (T) represents said terephthaloyl units iii); (SIP) represents the sodium salt form of said 5-sulfoisophthaloyl units iv); x is from about 1 to 2; y is from about 0.5 to about 66; z is from about 1.5 to about 40; q is from about 0.05 to about 26; wherein x, y, z and q represent the average number of moles of the corresponding units per mole of said ester.

12. The soil release agent of claim 11 further characterized in that the oxyethyleneoxy:oxy-1,2-propyleneoxy mole ratio ranges from about 0.5:1 to about 1:0;

x is about 2, y is from about 3 to about 18, and z is from about 3 to about 15, and q is from about 0.5 to about 4.

13. The soil release agent of claim 12 wherein x is about 2, y is about 5, z is about 5, and q is about 1.

14. The soil release agent of claim 12 which is comprised of at least about 50% by weight of said ester having molecular weight ranging from about 500 to about 5,000 and at least about 3% of said stabilizer.

15. A water-soluble or dispersible soil release agent according to claim 11, derived by a process which comprises at least one step of reacting:
A) dimethyl terephthalate;
B) one or more glycol reactants selected from the group consisting of:
  a) ethylene glycol;
  b) a mixture of ethylene glycol and propylene glycol; and
  c) a mixture of a) or b) with diethylene glycol, triethylene glycol, tetraethylene glycol or a mixture thereof;
C) dimethyl sulfoisophthalate: and
D) a compound selected from the group consisting of monovalent cation salts of said sulfonated polyethoxy/propoxy end-caps, in the presence of at least one conventional transesterification catalyst and one or more crystallization-reducing stabilizer.

16. A method of laundering fabrics and concurrently providing a soil release finish thereto, comprising contacting said fabrics with an aqueous laundry liquor containing conventional detersive ingredients and from about 1 to about 50 ppm of a soil release agent which is an oligomeric composition comprising at least 10% by weight of a substantially linear, sulfonated end-capped ester and one or more crystallization-reducing stabilizer.

17. A method according to claim 16, wherein said conventional detersive ingredients comprise one or more conventional anionic surfactants; said soil release agent is present at a level of from about 2.5 to about 30 ppm in said aqueous laundry liquor and is further characterized in that it consists essentially of a water-soluble or water-dispersible composition comprising:
A) at least about 10% by weight of a substantially linear sulfonated poly-ethoxy/propoxy end-capped ester having molecular weight ranging from about 500 to about 8,000; said ester consisting essentially of, on a molar basis:
  i) from about 1 to about 2 moles of sulfonated polyethoxy/propoxy end-capping units of the formula

wherein M is a salt-forming cation such as sodium or tetraalkylammonium, m is 0 or 1, R is ethylene, propylene or a mixture thereof, and n is from 0 to 2; and mixtures thereof;
  ii) from about 0.5 to about 66 moles of units selected from the group consisting of:
    a) oxyethyleneoxy units;
    b) a mixture of oxyethyleneoxy and oxy-1,2-propyleneoxy units wherein said oxyethyleneoxy units are present in an oxyethyleneoxy to oxy-1,2-propleneoxy mole ratio ranging from 0.5:1 to about 10:1; and
    c) a mixture of a) or b) with poly(oxyethylene)oxy units wherein said poly(oxyethylene)oxy units have a degree of polymerization of from 2 to 4; provided that when said poly(oxyethylene)oxy units have a degree of polymerization of 2, the mole ratio of poly(oxyethylene)oxy units to total group ii) units ranges from 0:1 to about 0.33:1; and when said poly(oxyethylene)oxy units have a degree of polymerization of 3, the mole ratio of poly(oxyethylene)oxy units to total group ii) units ranges from 0:1 to about 0.22:1; and when said poly(oxyethylene)oxy units have a degree of polymerization of 4, the mole ratio of poly(oxyethylene)oxy units to total group ii) units ranges from 0:1 to about 0.14:1;
  iii) from about 1.5 to about 40 moles of terephthaloyl units; and
  iv) from 0 to about 26 moles of 5-sulfoisophthaloyl units of the formula

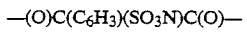

wherein M is a salt-forming cation; and
B) from about 0.5% to about 20% by weight of ester of one or more crystallization-reducing stabilizers.

18. A method according to claim 16, wherein said fabrics are subjected to two or more cycles each comprising the ordered sequence of steps:
  a) contacting said fabrics with said aqueous laundry liquor in a conventional automatic washing-machine or by hand-wash for periods ranging from about 5 minutes to about 1 hour;
  b) rinsing said fabrics with water;
  c) line- or tumble-drying said fabrics; and
  d) exposing said fabrics to soiling through normal wear or domestic use.

19. A detergent composition comprising from about 5% to about 80% of a detersive surfactant and at least about 0.1% by weight of a soil release agent according to claim 1.

20. A composition according to claim 19 wherein the soil release agent comprises at least about 10% by weight of an ester of the formula

wherein (CAP) represents the sodium salt form of said sulfonated end-capping units i); (EG/PG) represents said oxyethyleneoxy, oxy-1,2-propyleneoxy, and poly(oxyethylene)oxy units ii); (T) represents said terephthaloyl units iii); x is about 2; y is from about 6; z is about 6; wherein x, y and z represent the average number of moles of the corresponding units per mole of said ester; and from about 0.5% to about 20% by weight of ester of one or more crystallization-reducing stabilizers.

21. A composition according to claim 19 wherein the soil release agent comprises at least about 10% by weight of an ester of the formula

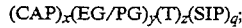

wherein (CAP) represents the sodium salt form of said sulfonated end-capping units i); (EG/PG) represents said oxyethyleneoxy, oxy-1,2-propyleneoxy and poly(oxyethylene)oxy units ii); (T) represents said terephthaloyl units iii); (SIP) represents the sodium salt form of said 5-sulfoisophthaloyl units iv); x is about 2; y is about 5; z is about 5; q is 1; wherein x, y, z and q represent the average number of moles of the corresponding units per mole of said ester; and from about 0.5% to about 20% by weight of ester of one or more crystallization-reducing stabilizer.

22. A composition according to claim 19 further comprising a preformed peroxyacid bleach.

23. A composition according to claim 19 further comprising from about 1% to about 20% of a peroxygen bleach and from about 0.5% to about 20% of a bleach activator.

24. A composition according to claim 23 wherein said surfactant is a nonionic primary alcohol ethoxylate; said peroxygen bleach is sodium percarbonate; and wherein said composition further comprises at least about 0.001% of a cellulase enzyme and from about 0.5% to about 10% of a dye transfer inhibiting agent.

25. A method of reducing the crystallization of oligomeric esters comprising combining one or more crystallization-reducing stabilizer with an oligomeric soil release agent comprising at least 10% by weight of a substantially linear, sulfonated end-capped ester.

26. A method according to claim 25 wherein the crystallization-reducing stabilizer is selected from the group consisting of:
  i) alkali metal and tetraalkylammonium salts of aromatic sulfonic acids or substituted aromatic sulfonic acids selected from the group consisting of:
    a) $(R_1)_n Ar\text{-}SO_3M$;
    b) $(R_2)Ar(SO_3M)\text{-}O\text{-}(R_2)Ar(SO_3M)$; and
    c) mixtures thereof, wherein Ar is an aromatic hydrocarbon group, each $R_1$ is a hydrogen radical or a $C_1$–$C_4$ alkyl group, each $R_2$ is a $C_1$–$C_{18}$ alkyl group, n is from 0 to 3, and M is an alkali metal or tetraalkytammonium ion;
  ii) alkali metal and tetraalkylammonium salts of linear or branched alkylbenzenesulfonates wherein the alkyl group is from about $C_5$ to about $C_{16}$, preferably from about $C_{11}$ to about $C_{13}$;
  iii) thermally-stable alkyl chain sulfonates wherein the alkyl chain contains from about 4 to about 20 carbon atoms; and
  iv) mixtures thereof.

27. A method according to claim 25 wherein the sulfonated end-capped ester comprises from about 25 to about 100% by weight of ester having the "empirical formula $$(CAP)_x(EG/PG)_y(T)_z;$$

wherein (CAP) represents the sodium salt form of said sulfonated end-capping units i); (EG/PG) represents said oxyethyleneoxy, oxy-1,2-propyleneoxy and poly-(oxyethylene)oxy units ii); (T) represents said terephthaloyl units iii); x is from about 1 to 2; y is from about 0.5 to about 7; z is from about 1.5 to about 7; wherein x, y and z represent the average number of moles of the corresponding units per mole of said ester.

28. A method according to claim 25 wherein the sulfonated end-capped ester comprises from about 25 to about 100% by weight of ester having the empirical formula $$(CAP)_x(EG/PG)_y(T)_z(SIP)_q;$$

wherein (CAP) represents the sodium salt form of said sulfonated end-capping units i); (EG/PG) represents said oxyethyleneoxy, oxy-1,2-propyleneoxy and poly-(oxyethylene)oxy units ii); (T) represents said terephthaloyl units iii); (SIP) represents the sodium salt form of said 5-sulfoisophthaloyl units iv); x is from about 1 to 2; y is from about 0.5 to about 66; z is from about 1.5 to about 40; q is from about 0.05 to about 26; wherein x, y, z and q represent the average number of moles of the corresponding units per mole of said ester.

* * * * *